United States Patent
Hatakeyama et al.

(10) Patent No.: US 10,786,941 B2
(45) Date of Patent: Sep. 29, 2020

(54) DOUBLE-LAYERED CONTAINER AND METHOD FOR PRODUCTION OF THE SAME

(71) Applicant: Heiwa Kagaku Industry Co., Ltd., Ichikawa-shi, Chiba (JP)

(72) Inventors: Kazuyuki Hatakeyama, Ichikawa (JP); Harumasa Hatakeyama, Ichikawa (JP)

(73) Assignee: HEIWA KAGAKU INDUSTRY CO., LTD., Ichikawa-shi (JP)

( * ) Notice: Subject to any disclaimer, the term of this patent is extended or adjusted under 35 U.S.C. 154(b) by 173 days.

(21) Appl. No.: 16/077,520

(22) PCT Filed: Feb. 16, 2017

(86) PCT No.: PCT/JP2017/005746
§ 371 (c)(1),
(2) Date: Aug. 13, 2018

(87) PCT Pub. No.: WO2017/142027
PCT Pub. Date: Aug. 24, 2017

(65) Prior Publication Data
US 2019/0070770 A1    Mar. 7, 2019

(30) Foreign Application Priority Data
Feb. 16, 2016  (JP) .................................. 2016-027137

(51) Int. Cl.
*B29C 49/48*  (2006.01)
*B29C 49/22*  (2006.01)
(Continued)

(52) U.S. Cl.
CPC .......... *B29C 49/4802* (2013.01); *B29C 49/04* (2013.01); *B29C 49/22* (2013.01);
(Continued)

(58) Field of Classification Search
CPC ....... B29C 49/4802; B29C 49/22; B32B 1/02; B32B 27/365; B65D 1/0215
(Continued)

(56) References Cited

U.S. PATENT DOCUMENTS

| 10,518,462 B2 * | 12/2019 | Hatakeyama | B32B 1/02 |
| 2003/0226856 A1 * | 12/2003 | Nakamura | B65D 1/0215 222/105 |
| 2014/0039444 A1 * | 2/2014 | Togawa | A61J 1/065 604/403 |

FOREIGN PATENT DOCUMENTS

| JP | 8-80929 A | 3/1996 |
| JP | 10-45180 A | 2/1998 |

(Continued)

OTHER PUBLICATIONS

International Search Report dated Apr. 11, 2017, issued in counterpart application No. PCT/JP2017/005746. (2 pages).

Primary Examiner — King M Chu
(74) Attorney, Agent, or Firm — Westerman, Hattori, Daniels & Adrian, LLP

(57) ABSTRACT

Provided is a method for producing a double-layered container which can be easily produced using molding equipment that is not much different from conventionally used equipment and which comprises: a rigid outer layer container part; and a flexible inner layer container part of which the capacity can be changed inside the rigid outer layer container part, wherein, when a pair of partial molds are brought close to each other in order to be combined to form a split mold, at least parts of the joining faces of the pair of partial molds pinch a small outer diameter portion of a parison so as to form a gap burr, and, when a cap is screwed on, a gap for introducing external air in the interlayer of the
(Continued)

double-layered container is formed at the small outer diameter portion from which the gap burr has been removed.

17 Claims, 18 Drawing Sheets

(51) Int. Cl.
<table>
<tr><td>B65D 1/02</td><td>(2006.01)</td></tr>
<tr><td>B29C 49/04</td><td>(2006.01)</td></tr>
<tr><td>B32B 1/02</td><td>(2006.01)</td></tr>
<tr><td>B32B 27/08</td><td>(2006.01)</td></tr>
<tr><td>B32B 27/30</td><td>(2006.01)</td></tr>
<tr><td>B32B 27/32</td><td>(2006.01)</td></tr>
<tr><td>B32B 27/34</td><td>(2006.01)</td></tr>
<tr><td>B32B 27/36</td><td>(2006.01)</td></tr>
<tr><td>B65D 23/02</td><td>(2006.01)</td></tr>
<tr><td>B65D 51/16</td><td>(2006.01)</td></tr>
<tr><td>B29L 31/00</td><td>(2006.01)</td></tr>
<tr><td>B29K 23/00</td><td>(2006.01)</td></tr>
<tr><td>B29K 69/00</td><td>(2006.01)</td></tr>
<tr><td>B29K 77/00</td><td>(2006.01)</td></tr>
</table>

(52) U.S. Cl.
CPC ............... *B32B 1/02* (2013.01); *B32B 27/08* (2013.01); *B32B 27/306* (2013.01); *B32B 27/32* (2013.01); *B32B 27/34* (2013.01); *B32B 27/365* (2013.01); *B65D 1/02* (2013.01); *B65D 1/0215* (2013.01); *B65D 1/0246* (2013.01); *B65D 23/02* (2013.01); *B65D 51/16* (2013.01); *B29C 2049/4807* (2013.01); *B29K 2023/0633* (2013.01); *B29K 2023/086* (2013.01); *B29K 2023/12* (2013.01); *B29K 2069/00* (2013.01); *B29K 2077/00* (2013.01); *B29L 2031/712* (2013.01); *B29L 2031/7158* (2013.01); *B32B 2439/00* (2013.01)

(58) Field of Classification Search
USPC .................................................. 220/495.03
See application file for complete search history.

(56) References Cited

FOREIGN PATENT DOCUMENTS

<table>
<tr><td>JP</td><td>3368484 B2</td><td>1/2003</td></tr>
<tr><td>JP</td><td>2003-72785 A</td><td>3/2003</td></tr>
<tr><td>JP</td><td>3627946 B2</td><td>3/2005</td></tr>
<tr><td>JP</td><td>2006-335398 A</td><td>12/2006</td></tr>
<tr><td>JP</td><td>2007-320596 A</td><td>12/2007</td></tr>
<tr><td>JP</td><td>4936249 B2</td><td>5/2012</td></tr>
</table>

\* cited by examiner

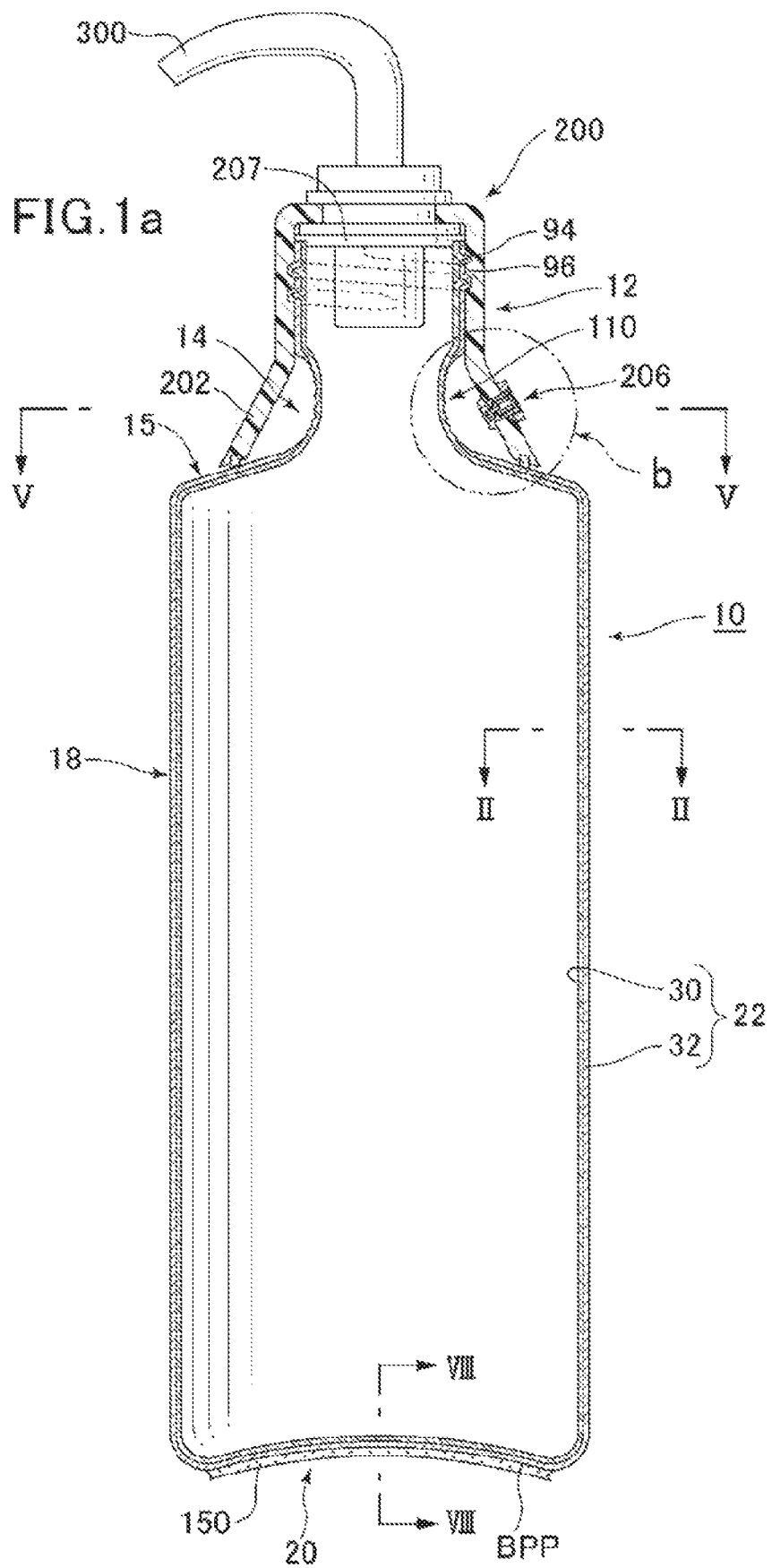

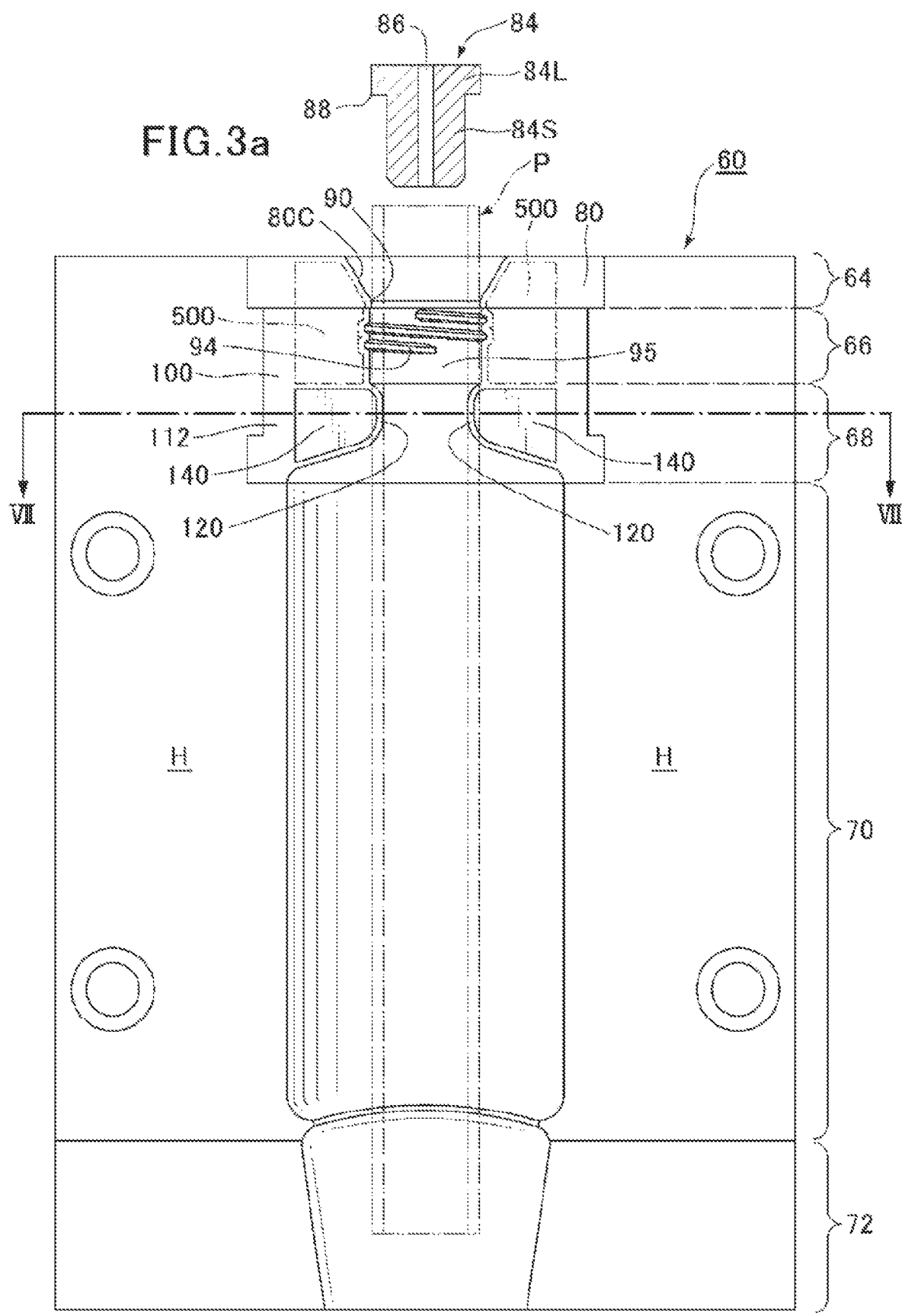

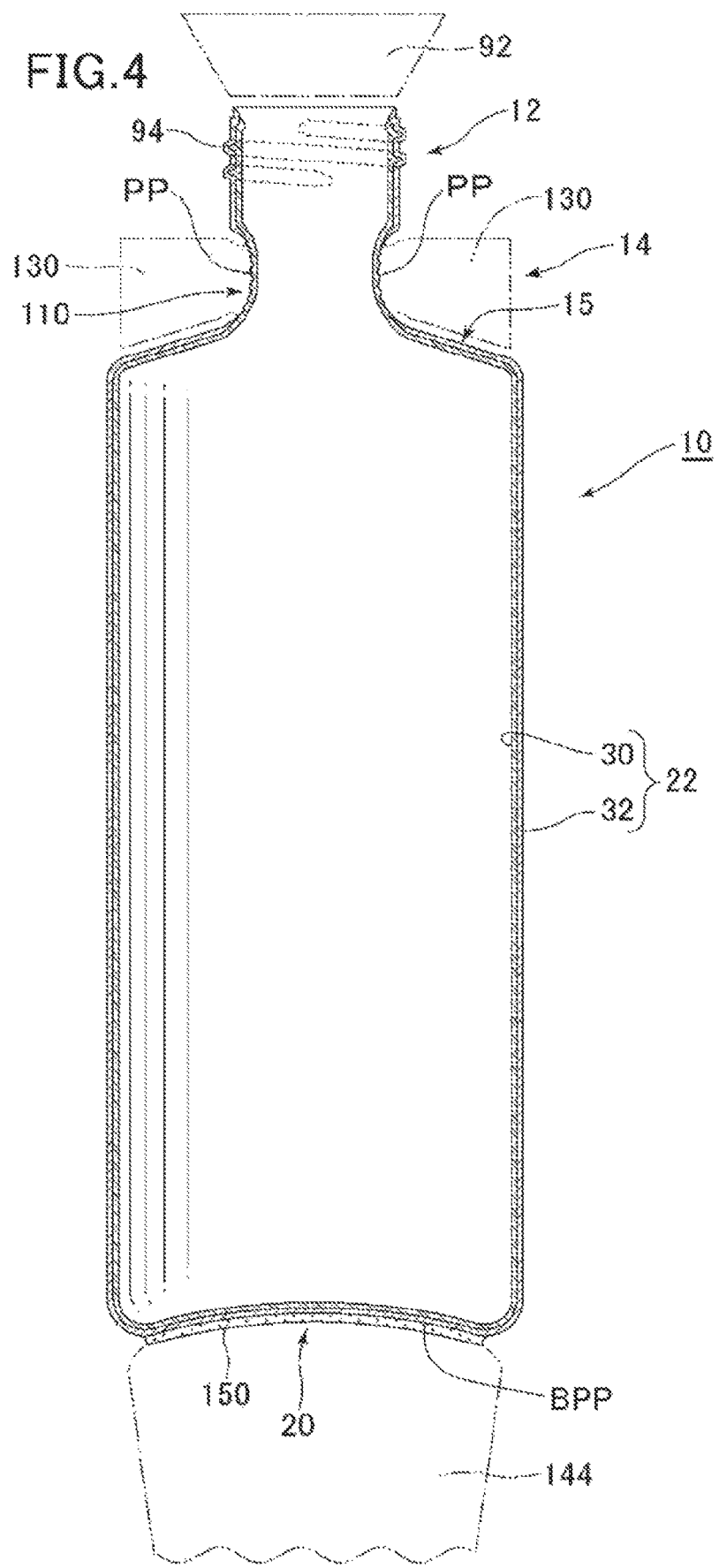

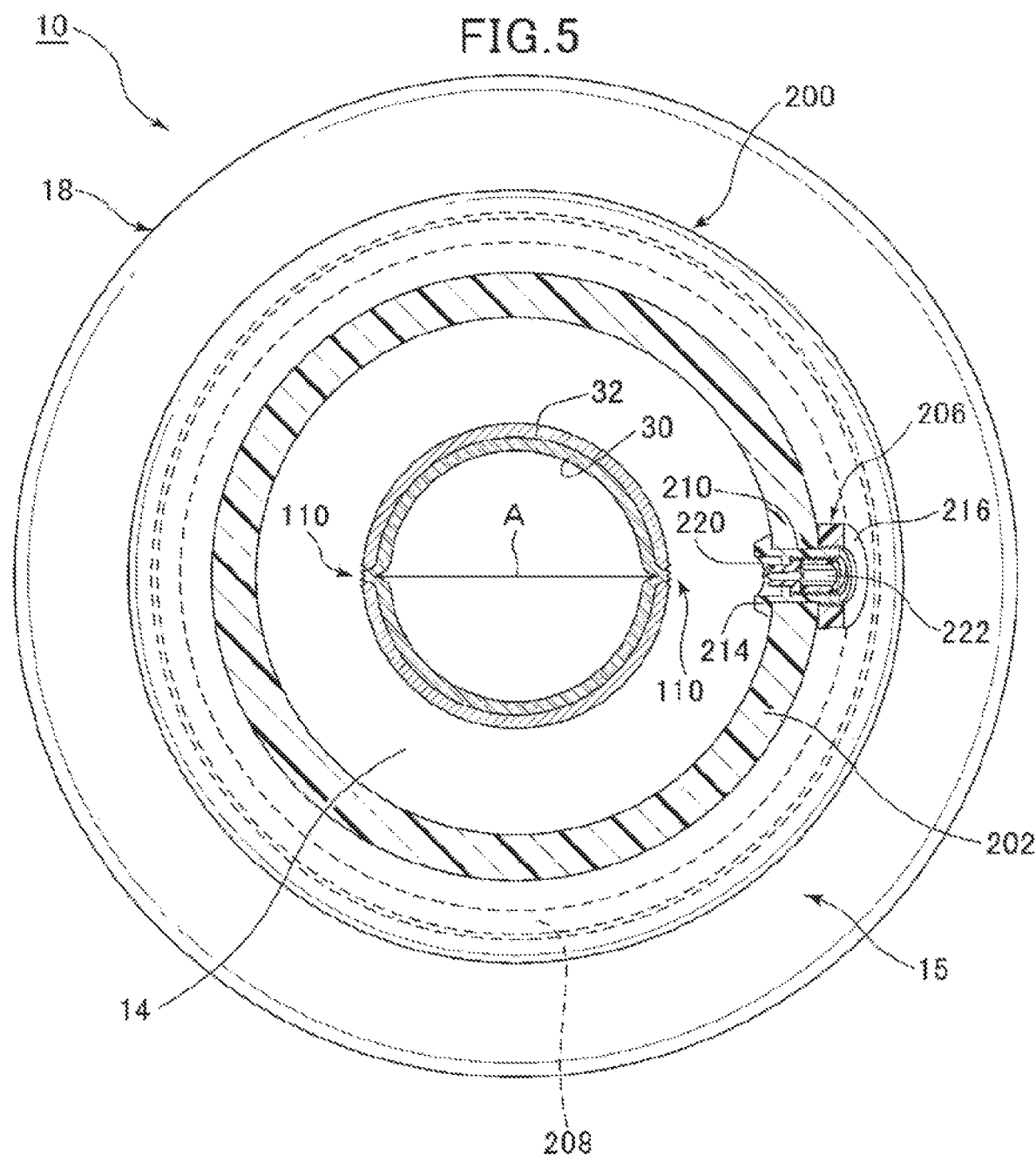

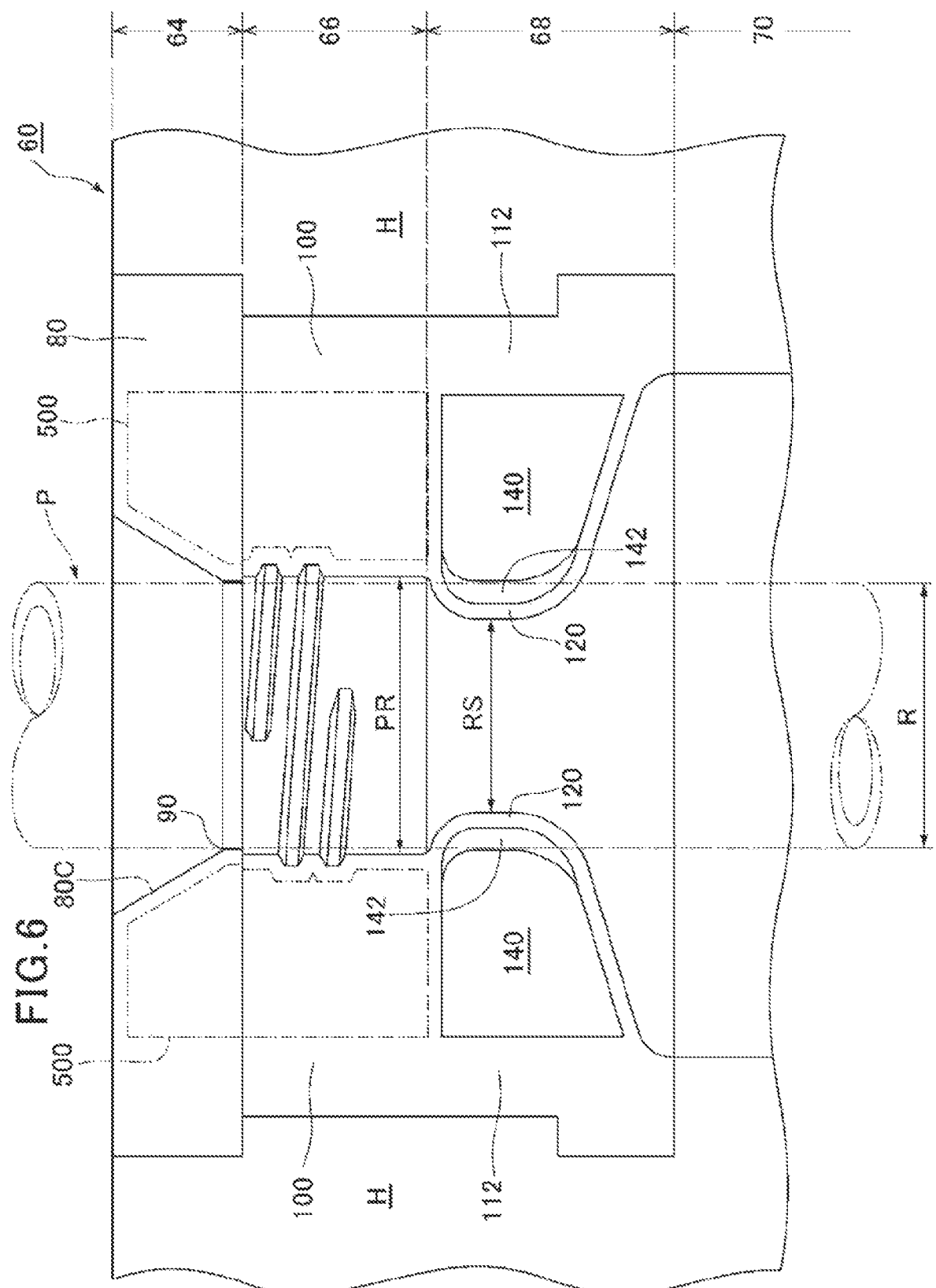

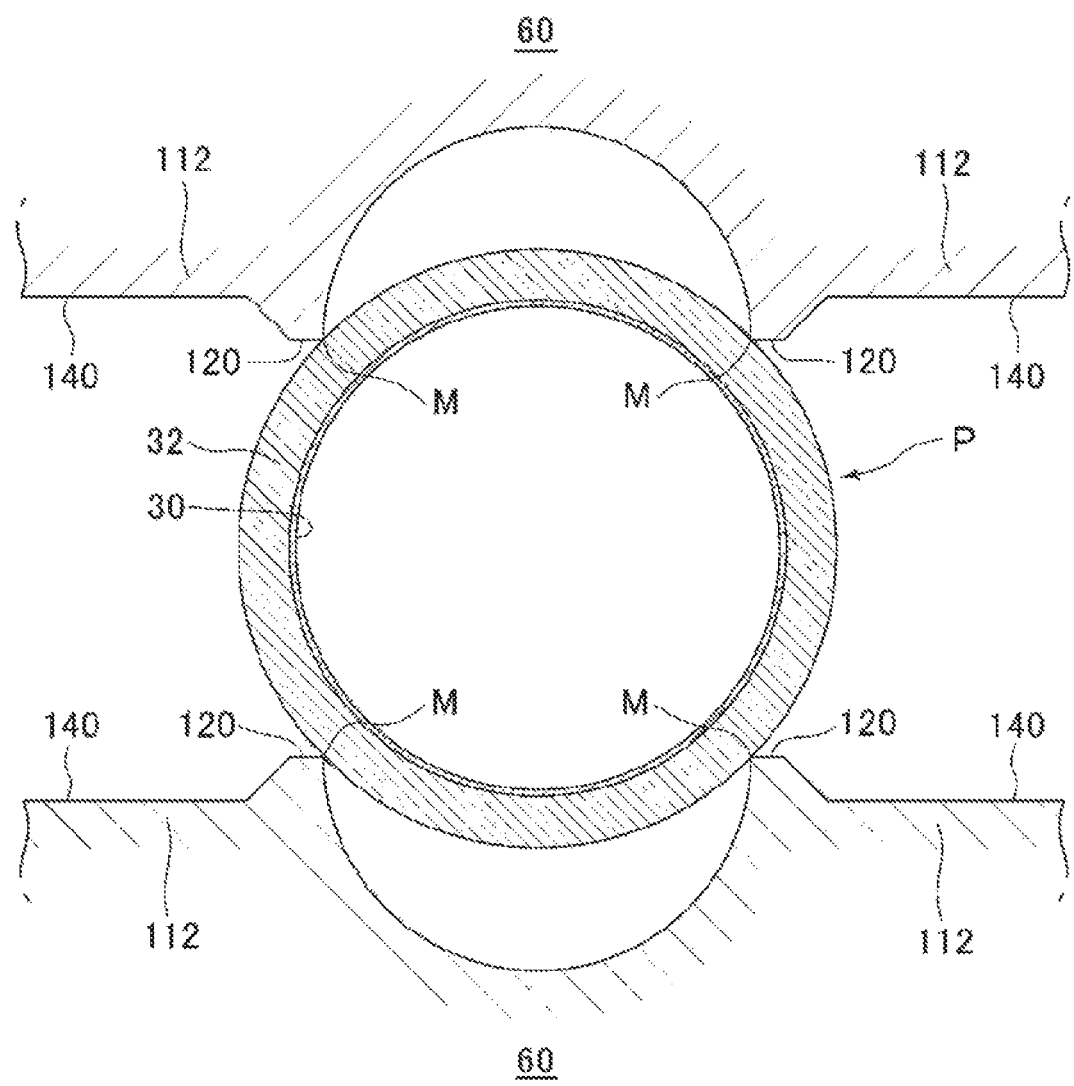

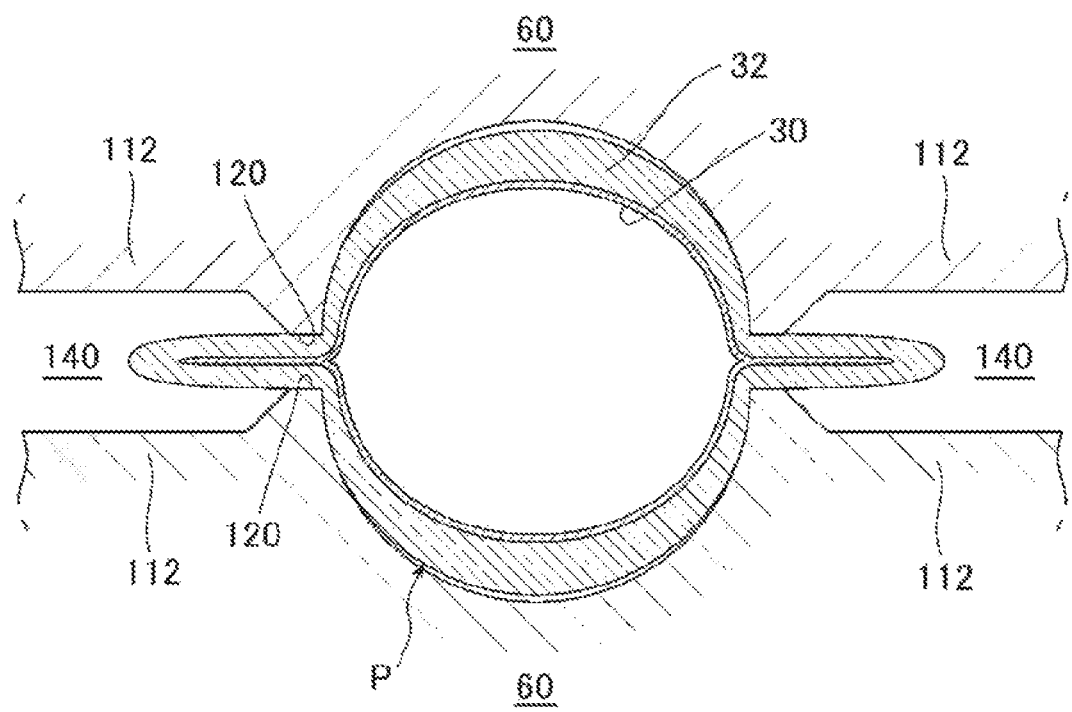

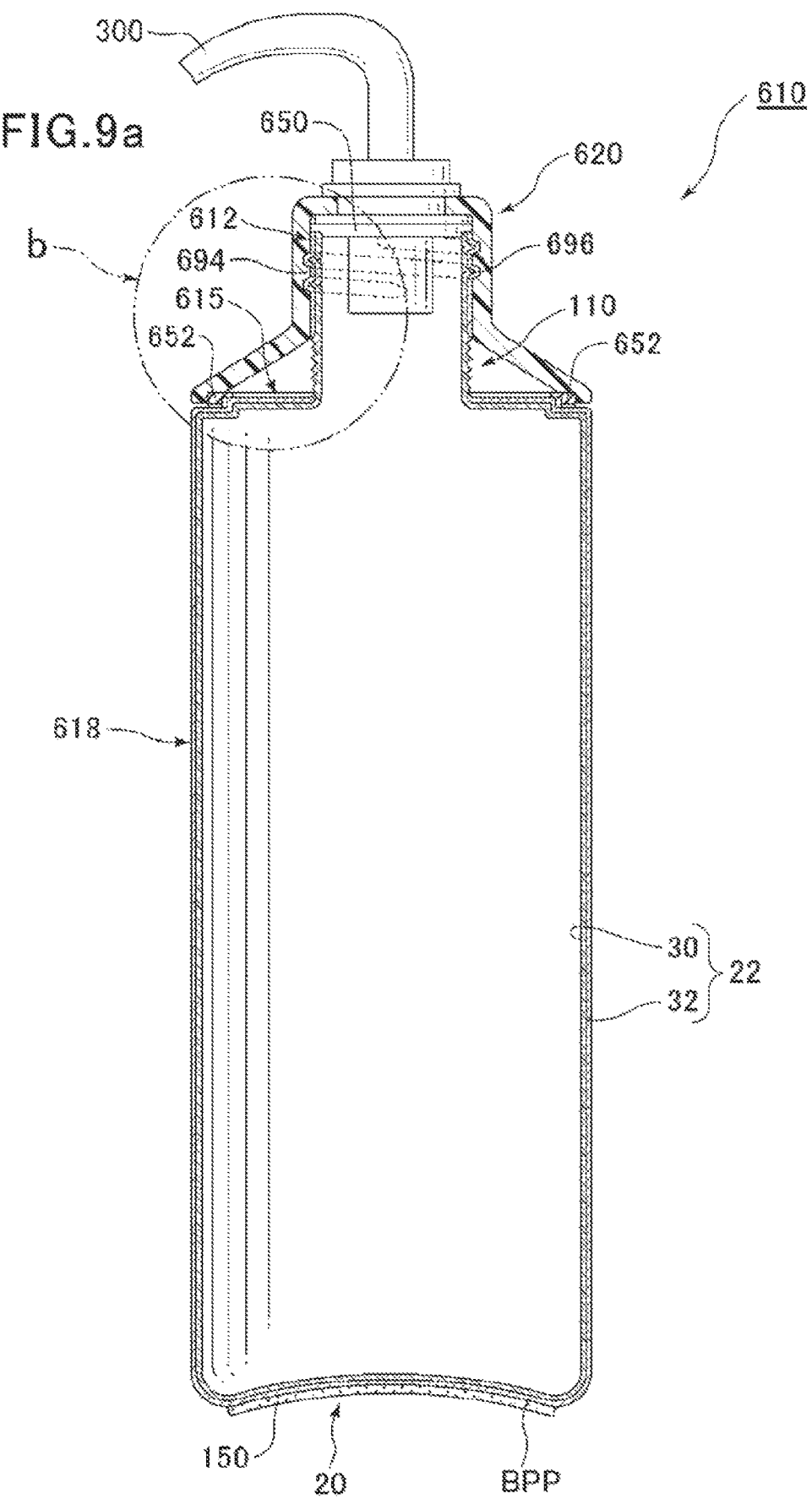

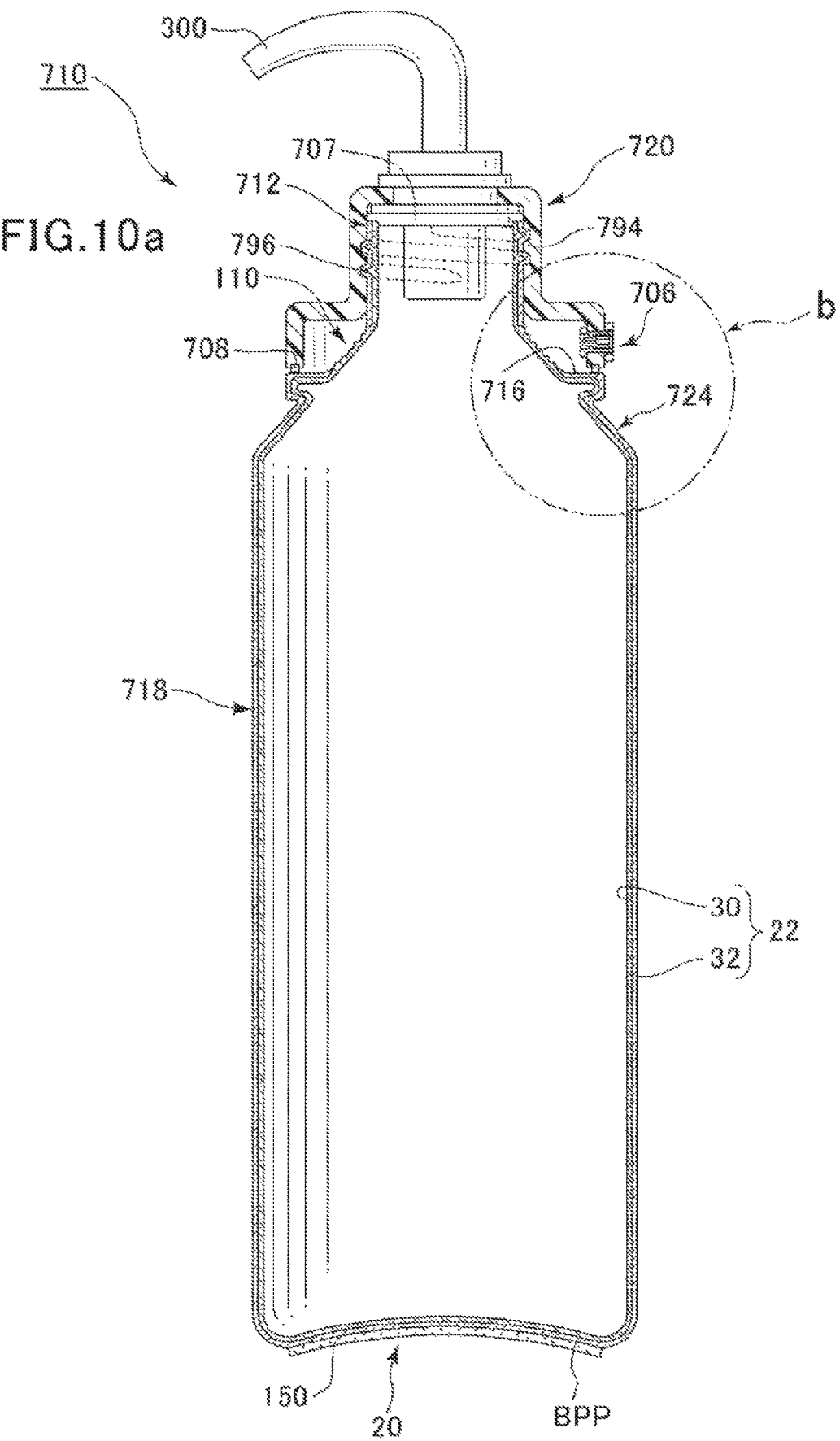

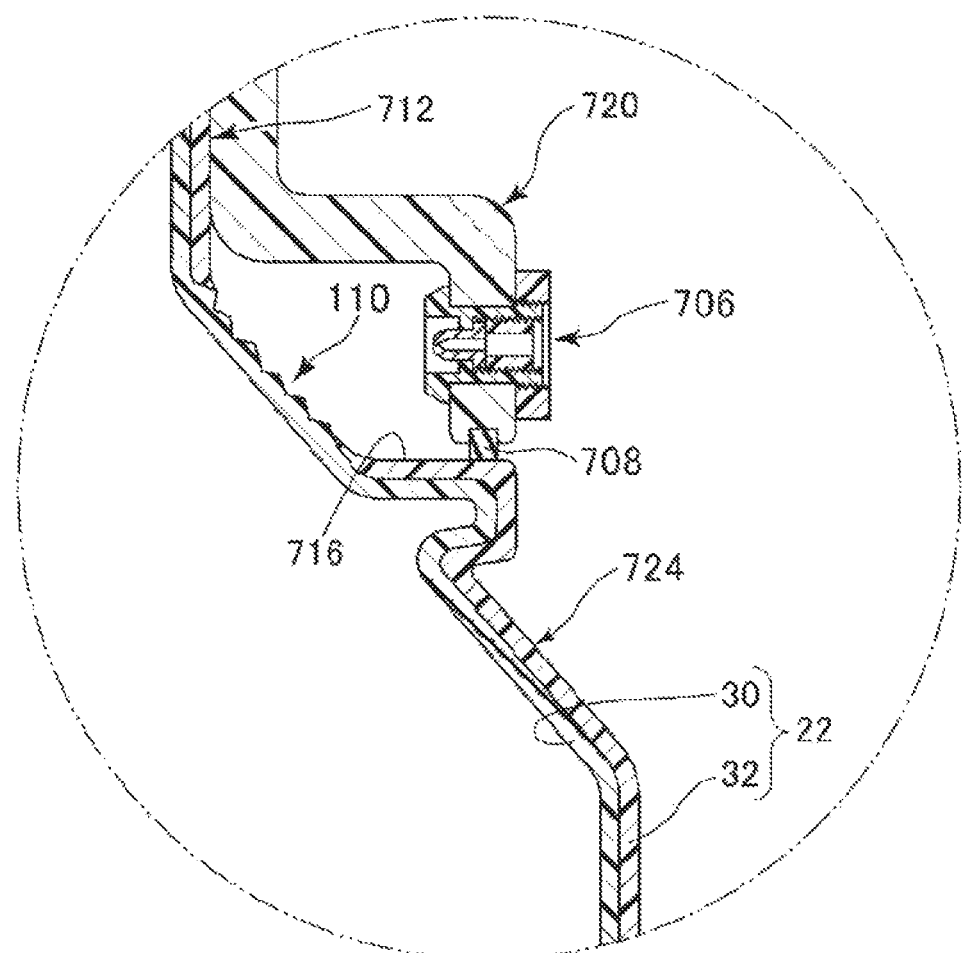

DOUBLE-LAYERED CONTAINER AND METHOD FOR PRODUCTION OF THE SAME

TECHNICAL FIELD

The present invention relates to a double-layered container and a method for producing the same. More particularly, the present invention relates to a double-layered container including a relatively rigid outer layer container part and a flexible inner layer container part, whose capacity can be changed inside the rigid outer layer container part according to the amount of the content therein, and also to a method for producing such a double-layered container with ease by using molding equipment and molding materials that are not much different from conventionally used equipment and materials.

BACKGROUND ART

Containers desirably can prevent the contents thereof from being exposed to the atmosphere and oxidized when the contents are partly consumed and their volumes are reduced.

More specifically, for ordinary containers, it is easy to prevent the contents thereof from being oxidized until the container is unsealed and opened by evacuating the internal space or filling the internal space with inert gas such as nitrogen gas after filling the container with the content. However, for ordinary containers, when the container is unsealed and opened and the content is partly consumed so that the unconsumed content is left in the container, external air gets into the container by the amount that corresponds to the consumed amount of the content to oxidize the content left in the container. The content may be made to contain an antioxidant in order to prevent the content from being oxidized.

To prevent the content left in a container from being oxidized, the container can be formed by using a rigid outer container part (rigid outer layer container part) and a flexible inner container part (flexible inner layer container part). Arrangements for not allowing the rigid outer layer container part to be deformed, in other words allowing it to maintain its self-standing ability as a whole, but letting the flexible inner container part to reduce its capacity by the amount that corresponds to the consumed amount of the content so as not to allow external air to get into the flexible inner container part have been proposed. Such containers are being produced for containing seasonings etc.

A problem to be solved for double-layered containers arranged so as to let the flexible inner container part to reduce its capacity by the amount that corresponds to the consumed amount of the content without allowing the rigid outer layer container part to be deformed is that the flexible inner container part, which has been held in contact with the inner surface of the rigid outer container part since the time when the double-layered container was produced, needs to be separated from the inner surface of the rigid outer container part to allow external air to get into the space produced between the flexible inner container part and the rigid outer container part by the amount that corresponds to the consumed amount of the content. If an opening for allowing external air to enter the space between the flexible inner container and the rigid outer container can reliably be formed at a double-layered container by using a simple device or without using any device with a simple and easy operation, such a container will be very useful.

As prior art relating to forming an opening for allowing external air to enter between the rigid outer container part and the flexible inner container part of a double-layered container, there have been proposed hollow laminated containers having at least a double-layered structure including an outer layer and an inner layer that are made of respective thermoplastic resin materials, wherein the outer layer and the inner layer that are held in contact with each other at the body wall part of the container are formed as easily separable laminated walls and an atmosphere introducing hole for allowing atmosphere to be introduced between the laminated walls is arranged below the threaded section formed on the outer peripheral surface of the mouth and neck section of the laminated container so as to be engaged with a lid or the like. The outer layer and the inner layer of the atmosphere introducing hole forming section are made to outwardly project and only the outer layer of the front end part of this section is made to be easily cut off to produce an opening that operates as atmosphere introducing hole without damaging the inner layer at the atmosphere introducing hole of the mouth and neck section of the laminated container, of which the inner layer is separable from the outer layer as mentioned above (see, for example, Patent Literature 1).

As prior arts that are different from the above-described ones but also relate to forming an opening to allow external air to enter, there have been proposed bottles formed by blow molding and including a synthetic resin-made outer layer, which operates as outer shell having a fixed profile, and a flexible synthetic resin-made inner layer, which is separably laid on the inside of the outer layer so as to operate as an inner bag, wherein a protrusion is formed so as to project from the lower end of the cylindrical mouth section directly standing up from the upper end of the body section of the bottle and an exposed part of the inner layer is arranged and located at the front end of the protrusion (see, for example, Patent Literature 2).

As prior arts that are still different from the above-described ones and also relate to forming an opening to allow external air to enter, there have been proposed double-layered containers having a mouth and neck section standing up from the body section of the container and including a synthetic resin-made shape-retainable outer layer and s synthetic resin-made inner layer that is arranged on the inner surface of the outer layer so as to be separable from the outer layer and can contract as the liquid content is taken out, wherein an air suction hole for introducing external air between the outer layer and the inner layer is produced as the outer layer is cut and removed from the outer surface at part of the corner where the upper end edge of the peripheral wall of the body section and the outer peripheral edge of the top wall of the body section meet from the direction intersecting the direction in which the corner projects (see, for example, Patent Literature 3).

As prior arts that are still different from the above-described ones and also relate to forming an opening to allow external air to enter, there have been proposed blow-molded synthetic resin-made containers including an outer layer, which operates as outer shell, and an inner layer, which is separably laid on the outer layer so as to operate as inner bag, wherein a flat knob that can be torn off at the base end section thereof is formed at a part of the outer layer laid on the inner layer and located near the front end of an outwardly bulged part of the inner layer formed at the peripheral wall of the cylindrical mouth section so as to stand up from the base end section, the base end section having a notch-shaped profile, the outwardly bulged part of the inner layer being produced as part of the peripheral wall of the cylindrical mouth section thereof with the outer layer so as to become bulged at the time of blow molding, the knob being formed as the part of the outer layer laid on the inner layer at a position located near the front end of the inner layer by pressing it between the joining faces of the mold parts of the split mold used for the blow molding, the notch-shaped profile of the base end section being produced along the mold cavity at the time of forming the bulged part, an air suction hole for introducing external air between the outer layer and the inner layer being produced as the outer layer is partly peeled off from the inner layer at a position near the front end of the bulged section thereof (see, for example, Patent Literature 4).

PRIOR ART LITERATURES

Patent Literatures

Patent Literature 1: JP 2006-335398 A
Patent Literature 2: Japanese Patent No. 3,368,484
Patent Literature 3: Japanese Patent No. 3,627,946
Patent Literature 4: Japanese Patent No. 4,936,249

Problems to be Solved by the Invention

The operation where "the outer layer and the inner layer of the atmosphere introducing hole forming section are made to outwardly project" as proposed in Patent Literature 1 is conducted by forming a recess in the mold and pushing part of the laminated parison having an inner layer and an outer layer into the recess under blow pressure. However, the amount of the parison that is pushed into the recess varies as a function of the blow pressure, the parison temperature, the ambient temperature, the mold temperature, the blow timing, the blown air temperature and so on and, additionally, the position of the outer surface of the inner layer is not constantly fixed. Therefore, the post processing for realizing that "only the outer layer of the front end part of this outwardly projecting portion is made to be easily cutoff to produce an opening for the atmosphere introducing hole with ease without damaging the inner layer at the atmosphere introducing hole of the mouth and neck section of the laminated container" requires a processing operation using a high precision milling machine and hence is not suited for producing containers on a mass production basis. Additionally, if the outer layer is left unremoved after the processing operation, introduction of external air is obstructed whereas, if the inner layer is damaged or broken, the container will no longer be operational.

"A protrusion is formed so as to project from the lower end of the cylindrical mouth section directly standing up from the upper end of the body section of the bottle" as proposed in Patent Literature 2 is produced by forming an recess in the mold and pushing part of the laminated parison having an inner layer and an outer layer into the recess under blow pressure. The thickness of the protrusion varies as a function of the blow pressure, the parison temperature and so on and, additionally, the position of the outer surface of the inner layer is not constantly fixed. Therefore, the post processing for realizing that "an exposure part of the inner layer formed and located at the front end of the protrusion" is highly difficult from the industrial viewpoint.

Realization of that "the outer layer is cut and removed from the outer surface at part of the corner where the upper end edge of the peripheral wall of the body section and the outer peripheral edge of the top wall of the body section meet from the direction intersecting the direction in which the corner projects" as proposed in Patent Literature 3 is highly difficult from the industrial viewpoint as in the case of Patent Literatures 1 and 2 because the thickness of the entire container including part of the corner varies as a function of the blow pressure, the parison temperature and so on and it is also difficult to cut and remove the outer layer from the outer surface to expose the inner layer from the direction intersecting the direction in which the corner projects because contraction and other phenomena occur during the post molding cooling process.

"A flat knob that can be torn off at the base end section thereof is formed at a part of the outer layer laid on the inner layer located near the front end of an outwardly bulged part of the inner layer formed at the peripheral wall of the cylindrical mouth section so as to stand up from the base end section" as proposed in Patent Literature 4 is realized as "the knob is formed as the part of the outer layer laid on the inner layer at a position located near the front end of the inner layer by pressing it between the joining faces of the mold parts of the split mold used for the blow molding". Additionally, in an embodiment, "Here, the bulged part 11 of the inner layer 3 can be formed by molding part of the peripheral wall of the cylindrical mouth section 4 with the outer layer 2 so as to be bulged at the time of blow molding the container 1. And the knob 14 can be formed by pressing part of the outer layer 2 laid on the inner layer 3 near the front end part 12 between the joining faces of the mold parts of the split mold to be used for the blow molding" (paragraph 0019).

However, according to the cited invention, part of the outer layer 2 is made to be bulged in the recess for forming the knob 14 that is arranged at the joining faces of the mold parts of the split mold as the parson is pushed into the recess under the high pressure in the parison that is being subjected to a blow molding operation. At this time, while the volume of the parison that flows into the recess to produce the knob 14 is fixed, the extent to which the inner layer 2 is pushed into the inlet and its vicinity of the recess varies significantly as a function of the parison temperature, the blow pressure and so on at that time. Therefore, when the bulged part 14 is torn off at the notched section 13n, it is highly difficult to constantly expose the bulged part 11 of the inner layer 14 to the outside as illustrated in FIG. 5 of cited Patent Literature 4. In other words, it may be safe to assume that the invention of the cited Patent Literature 4 is only the product of mere thought and not industrially feasible at all.

OBJECT OF THE INVENTION

Therefore, the present invention of a double-layered container including a relatively rigid outer container and a flexible inner container arranged in the inside of the rigid outer container, the capacity of which flexible inner container can change according to the amount of the content therein, is made particularly in view of the above-identified problems relating to the opening for introducing external air. The object of the present invention is to provide a double-layered container including a relatively rigid outer layer container and a flexible inner layer container arranged in the inside of the rigid outer container, the capacity of which flexible inner container can change according to the amount of the content therein, and also a method for producing such a double-layered container by using molding equipment and molding materials that are not much different from conventionally used equipment and materials, wherein an opening for introducing external air can be formed very easily and highly reliably at cost lower than the processing cost of any of the prior arts.

Means for Solving the Problems

In the first aspect of the present invention, there is provided a method for producing a double-layered container from a parison having at least two layers of an inner layer and an outer layer for respectively forming a rigid outer layer container part and a flexible inner layer container part that are separable from each other of the double-layered container by means of a molding process of molding the double-layered container by using a split mold formed by combining at least a pair of partial parts, wherein the flexible inner layer container part can reduce it capacity while the rigid outer layer container part maintains its original profile as air is introduced between the rigid outer layer container part and the flexible inner layer container part, the double-layered container being provided with a threaded cap, characterized by including:

step A of forming a large diameter part having a predetermined diameter at the threaded part of the mouth section of the double-layered container to be engaged with the threaded cap, at the container main body part or between them, additionally forming a small diameter part having a diameter smaller than that of the large diameter part between the large diameter part and the threaded part of the mouth section to be engaged with the threaded cap and forming a gap burr by pinching the parts of the parison corresponding to the small diameter part between at least parts of the joining faces of the pair of partial molds when the pair of partial molds are brought close to each other so as to be combined to form the split mold;

step B of removing the gap burr formed in the step B;

step C of screwing the cap on and applying tension to the small diameter part cleared of the gap burr in the direction for separating the threaded part of the mouth section engaged with the threaded cap and the large diameter part to produce a gap at the area of the small diameter part cleared of the gap burr; and step D of forming a shield member for airtightly shielding the gap from the atmosphere on the double-layered container, the shield member having a one way valve for allowing external air to enter the gap.

In the second aspect of the present invention, there is provided a double-layered container produced from a parison having at least two layers of an inner layer and an outer layer for respectively forming a rigid outer layer container part and a flexible inner layer container part that are separable from each other of the double-layered container by means of a molding process of molding the double-layered container by using a split mold formed by combining at least a pair of partial molds, wherein the flexible inner layer container part can reduce it capacity while the rigid outer layer container part maintains its original profile as air is introduced between the rigid outer layer container part and the flexible inner layer container part, the double-layered container being provided with a threaded cap, characterized in that a large diameter part having a predetermined diameter and a small diameter part having a diameter smaller than that of the large diameter part are formed at the threaded part of the mouth section of the double-layered container to be engaged with the threaded cap, at the container main body part or between them;

that the gap burr formed by pinching the part of the parison corresponding to the small diameter part between at least parts of the joining faces of the pair of partial molds when the pair of partial molds are brought close to each other so as to be combined to form the split mold having been removed;

it being so arranged that, as the cap is screwed on, tension is applied to the small diameter part cleared of the gap burr in the direction for separating the threaded part of the mouth section engaged with the threaded cap and the large diameter part to produce a gap at the area of the small diameter part cleared of the gap burr;

the double-layered container having a shield member for airtightly shielding the gap from the atmosphere on the double-layered container, the shield member having a one way valve for allowing external air to enter the gap.

Advantageous Effect of the Invention

Therefore, according to the present invention, there are provided a double-layered container including a relatively rigid outer container and a flexible inner container arranged in the inside of the rigid outer container, the capacity of which flexible inner container can change according to the amount of the content therein and also a method for producing such a double-layered container by using molding equipment that is not much different from conventionally used equipment, wherein an opening for allowing external air to enter can be formed very easily and highly reliably at cost lower than the processing cost of any of the prior arts.
(Preferable Embodiments of the Present Invention in the First Aspect Thereof)

Preferably, the one way valve is fitted to the threaded cap.

Preferably, the one way valve is formed by using the threaded cap, the container main body part and a valve member arranged between the threaded cap and the container main body part.

Preferably, at least parts of the joining faces of at least the pair of partial molds are adapted to pinch the parison between the lateral side parts thereof located at horizontally oppositely disposed positions.

Preferably, at least parts of the contacting surfaces of at least the pair of partial molds pinch the parison at a position thereof.

Preferably, a knob projection is formed from the parison at the outside of the parts of the joining faces of at least the pair of partial molds that pinches the parison.

Preferably, the parts of the contacting surfaces of at least the pair of partial molds that pinch the parison correspond to the neck and shoulder section of the double-layered container.

Preferably, the parts of the contacting surfaces of at least the pair of partial molds that pinch the parison correspond to the mouth section of the double-layered container.

Preferably, the parts of the contacting surfaces of at least the pair of partial molds that pinch the parison correspond to the threaded part of the double-layered container.
(Preferable Embodiments of the Present Invention in the Second Aspect Thereof)

Preferably, the one way valve is fitted to the threaded cap.

Preferably, the one way valve is formed by using the threaded cap, the container main body part and a valve member arranged between the threaded cap and the container main body part.

Preferably, the position where the gap burr is removed is the threaded part for screwing the cap on, the container main body part or the lateral side parts thereof located between them at horizontally oppositely disposed positions.

Preferably, the position where the gap burr is removed is the threaded part for screwing the cap on, the container main body part or a position located between them.

Preferably, the position where the gap burr is removed is the neck and shoulder section of the double-layered container.

Preferably, the position where the gap burr is removed is the mouth section of the double-layered container.

Preferably, the position where the gap burr is removed is the threaded part for screwing the cap on of the double-layered container.

BRIEF DESCRIPTION OF THE DRAWINGS

FIG. 1a is a schematic longitudinal cross-sectional view of a double-layered container produced by the first embodiment of method for producing a double-layered container.

FIG. 1b is an enlarged schematic view of the one way valve illustrated in FIG. 1a.

FIG. 2 is an enlarged schematic cross-sectional view of the cylindrical lateral wall section of a double-layered container produced by the first embodiment of method for producing a double-layered container, taken along line II-II in FIG. 1a.

FIG. 3a is a schematic front view of a pair of partial molds forming a split mold to be used for the first embodiment of method for producing a double-layered container with a parison P placed at the molding position in the closed split mold.

FIG. 4 is a schematic longitudinal cross-sectional view of a molded product produced by the first embodiment of method for producing a double-layered container.

FIG. 5 is a schematic cross-sectional view of the neck and shoulder section taken along line V-V in FIG. 1a.

FIG. 6 is a schematic illustration of the first embodiment of method for producing a double-layered container.

FIG. 7b is a schematic view taken along line VII-VII in FIG. 3a, illustrating the step of forming a gap burr of the first embodiment of method for producing a double-layered container, representing the parison P brought into contact with the split mold.

FIG. 7d is a schematic view taken along line VII-VII in FIG. 3a, illustrating the step of forming a gap burr of the first embodiment of method for producing a double-layered container, representing a state where the parison P has been pinched by the split mold.

FIG. 9a is a schematic longitudinal cross-sectional view of a double-layered container produced by the fifth embodiment of method for producing a double-layered container.

FIG. 9b is an enlarged schematic view of the one way valve illustrated in FIG. 9a.

FIG. 10a is a schematic longitudinal cross-sectional view of a double-layered container produced by the sixth embodiment of method for producing a double-layered container.

FIG. 10b is an enlarged schematic view of the one way valve illustrated in FIG. 10a.

BEST MODE FOR CARRYING OUT THE INVENTION

First Embodiment

Figure 1B:
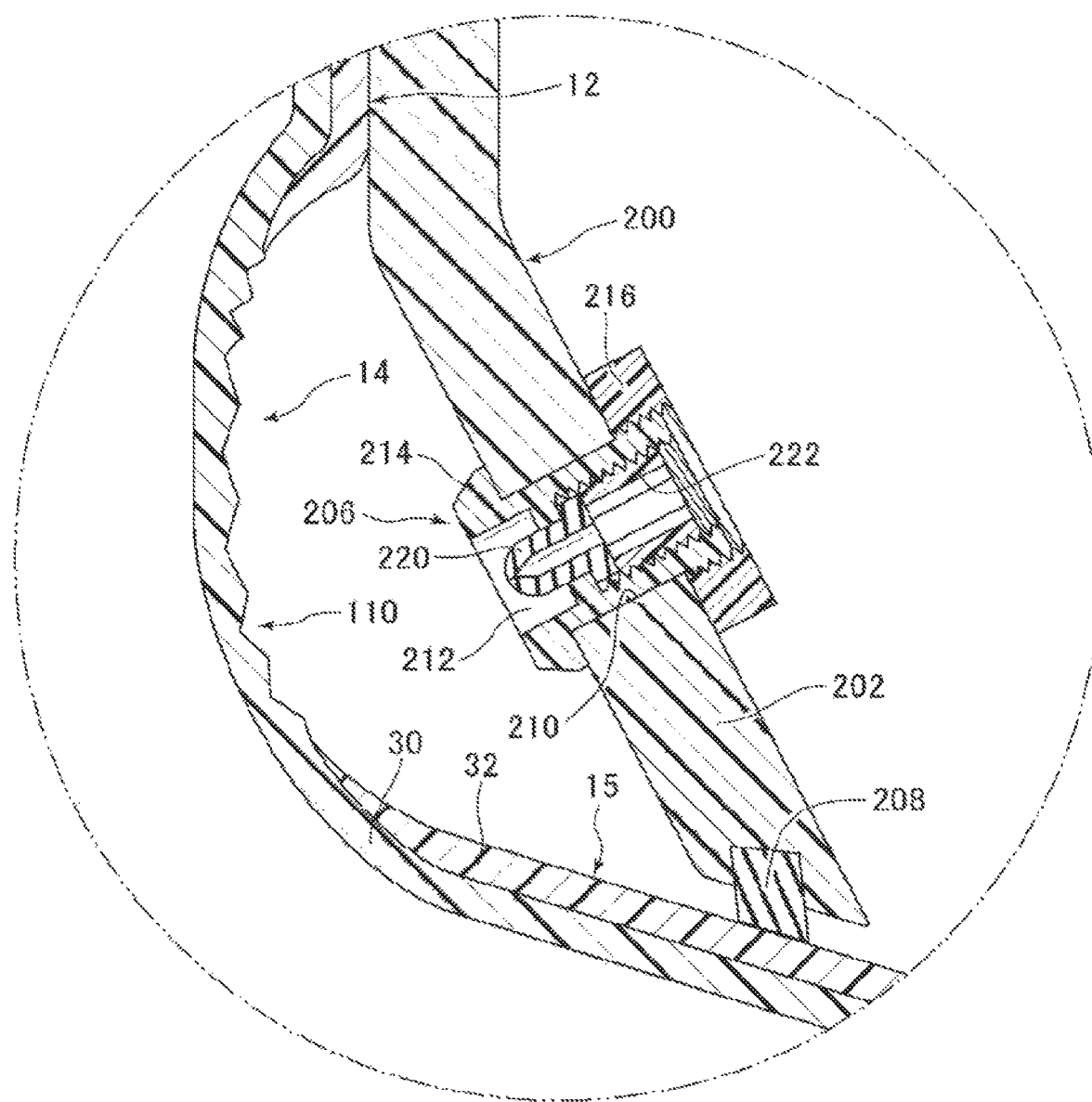

As illustrated in FIG. 1a, a double-layered container 10 manufactured by the first embodiment of method for producing a double-layered container includes a mouth section 12, a neck and shoulder section 15, a cylindrical body section 18, a bottom section 20 and a cap 200 having a spout 300.

Figure 2:
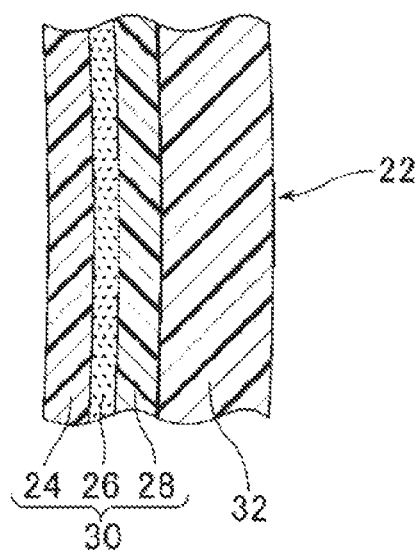

Of the double-layered container 10 produced by the first embodiment of method for producing a double-layered container, the cylindrical body section lateral surface 22 of the cylindrical body section 18 typically has a 3-layered flexible inner layer 30 including a low density polyethylene (LDPE) layer 24, an adhesive layer 26 of polyolefin-based adhesive resin or the like and an ethylene vinyl alcohol copolymer (EVOH) layer 28 as viewed from the inside and a polypropylene (PP) rigid outer layer 32 as illustrated in FIGS. 1a and 2. No adhesiveness exists between the flexible inner layer 30 and the rigid outer layer 32 and hence they can easily be separated from each other.

With the first embodiment of method for producing a double-layered container, a pair of partial molds 60, a front view of which is illustrated in FIG. 3a, are put together along the joining faces H thereof (see FIG. 6) to produce a split mold (not illustrated) for use. As illustrated in FIG. 3a, each of the partial molds 60 includes a mouth burr region 64, a mouth region 66, a neck and shoulder region 68, a cylindrical body section lateral wall region 70 and a bottom region 72.

The mouth burr region 64 is a region for producing an unnecessary top section 92 of a parison P as indicated by phantom line 92 in FIG. 4 and will ultimately be cut off. As illustrated in FIG. 3a, in the mouth burr region 64, a mouth burr mold part 80, which is a part of the split mold, is formed by using steel SKD11 and embedded in the extended part of the cylindrical body section lateral wall region 70 that is made of aluminum 7075.

A metal-made blow pin 84 that is to be partially pushed into parison P includes a large diameter cylindrical part 84L and a small diameter cylindrical part 84S and has a vertical through hole 86 running through the center of the blow pin 84, through which blown air will pass as illustrated in FIG. 3a.

Figure 3B:
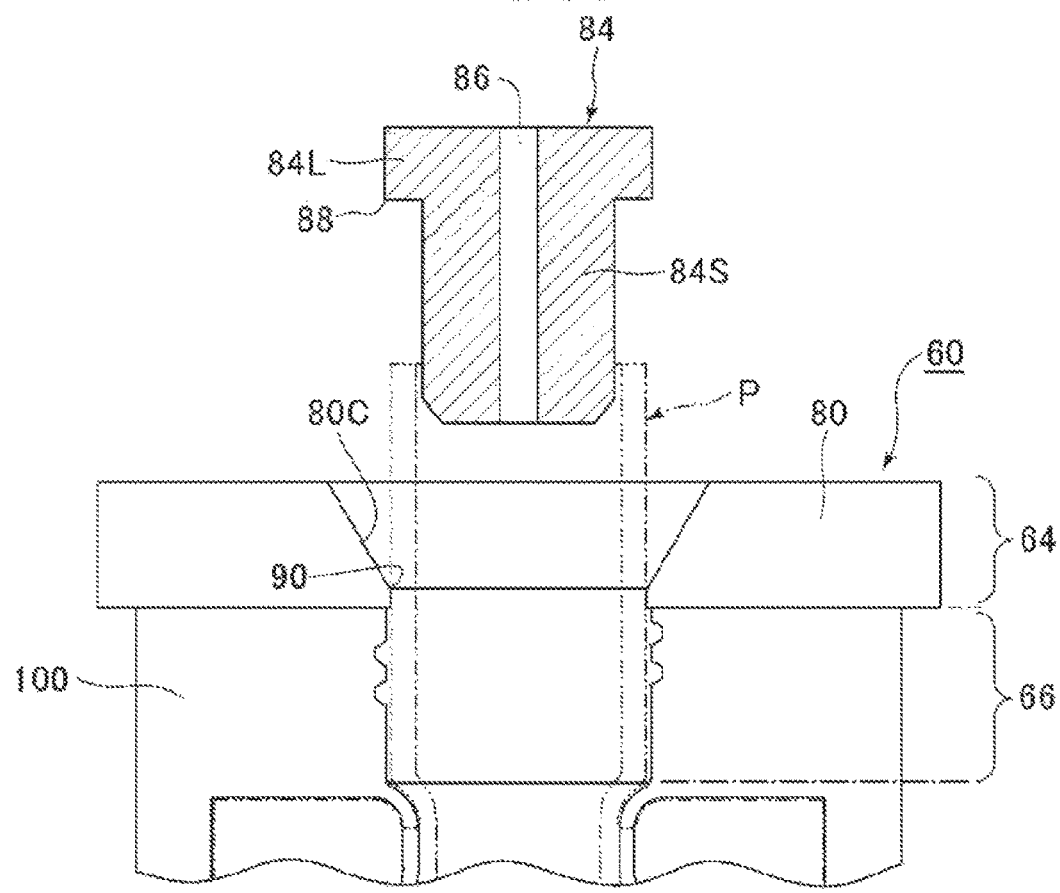
FIG. 3b is a schematic front view of parts of a pair of partial molds forming a split mold to be used for the first embodiment of method for producing a double-layered container in a state where a front end part of the blow pin has already been pushed into the parison P in the split mold.

With the first embodiment of method for producing a double-layered container, firstly, the front end part, or the small diameter cylindrical part 84S, of the blow pin 84 is pushed into the parison P as illustrated in FIG. 3b.

Figure 3C:
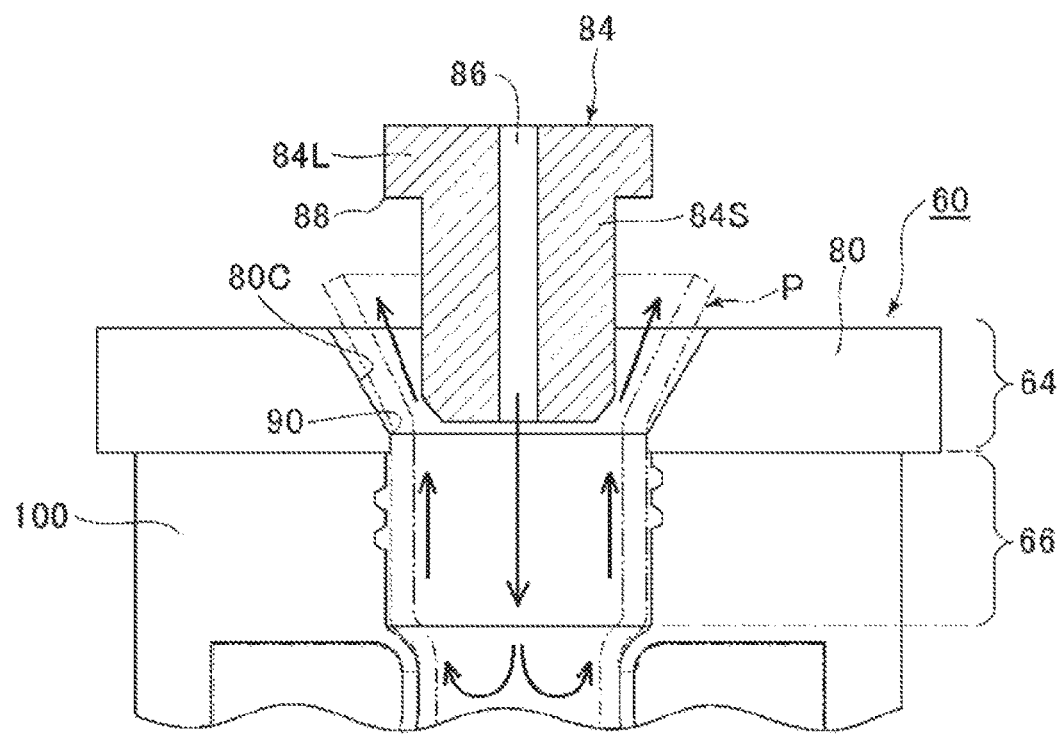
FIG. 3c is a schematic front view of parts of a pair of partial molds forming a split mold to be used for the first embodiment of method for producing a double-layered container in a state where a front end part of the blow pin has further been pushed into the parison P in the split mold.

Subsequently, as illustrated in FIG. 3c, air is blown into the parison P through the vertical through hole 86 of the blow pin 84 and the upper end part of the parison P is expanded so as to become broadened toward the top end by blowing out air.

Figure 3D:
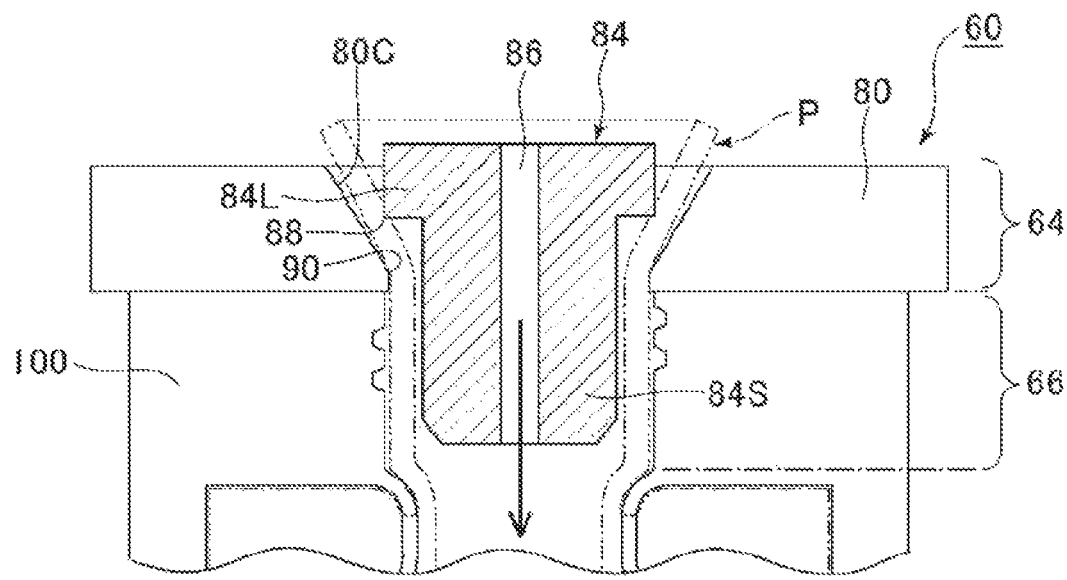
FIG. 3d is a schematic front view of parts of a pair of partial molds forming a split mold to be used for the first embodiment of method for producing a double-layered container in a state where the blow pin has entirely been pushed into the parison P in the split mold.
Figure 3E:
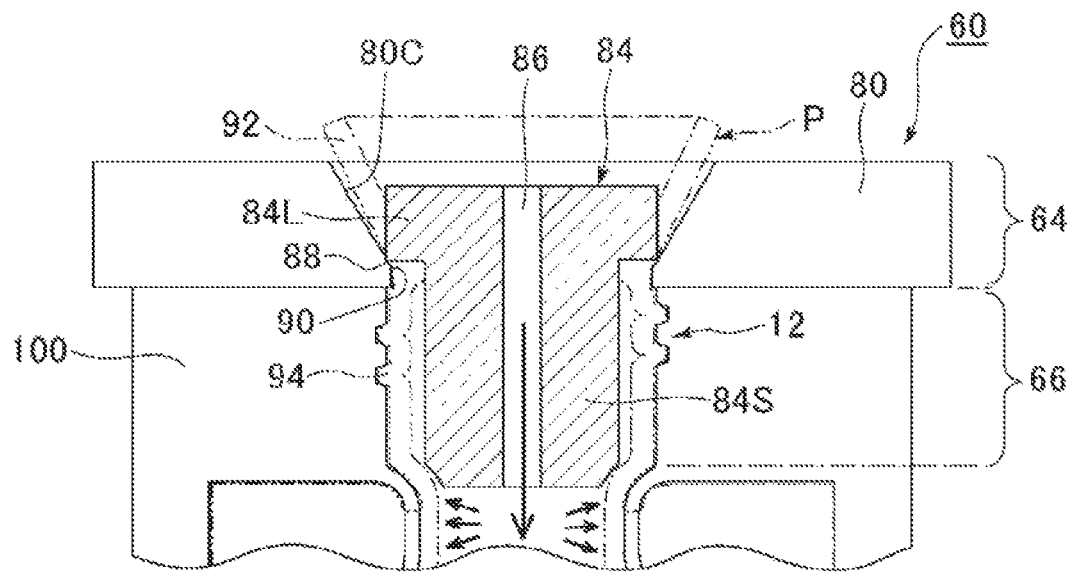
FIG. 3e is a schematic front view of parts of a pair of partial molds forming a split mold to be used for the first embodiment of method for producing a double-layered container in a state where the blow pin has entirely been pushed into the parison P in the split mold and the inside of the parison P has been pressurized.

Immediately thereafter, the lower corner edge 88 of the large diameter cylindrical part 84L of the blow pin 84 hits the parison P to tightly close the gap between the blow pin 84 and the parison P as illustrated in FIG. 3d. Then, as a result, the parison P is pressed against the mouth section mold parts 100 of the partial molds under the pressure of the air blown in through the blow pin 84 so that the mouth section 12 of a double-layered container is molded.

Subsequently, the lower corner edge 88 of the large diameter cylindrical part 84L of the blow pin 84 comes to hit the upwardly broadened semi-conical surfaces 80C that upwardly extend from an upper end 90 of the mouth section mold parts 100. Then, as a result of the hit, the parison P is cut there to make the mouth burr 92 easily removable.

The mouth section mold parts 100 are made of steel NAK55 and embedded in the extended parts of the cylindrical body section lateral wall regions 70 that are made of aluminum 7075.

As illustrated in FIG. 5, the rigid outer layer 32 of the neck and shoulder section 14 of the double-layered container 10 is cut apart to produce an outer layer gap 110 at the plane A that corresponds to the joining faces H of the partial molds (not illustrated in FIG. 5) of the split mold (not illustrated in FIG. 5 either) so that the flexible inner layer 30 is exposed at the outer layer gap 110. How the outer layer gap 110 is formed will be described in greater detail hereinafter.

As pointed out earlier, no adhesiveness exists between the flexible inner layer 30 and the rigid outer layer 32 and hence they can easily be separated from each other. Therefore, as the volume of the space formed in the flexible inner layer 30 is reduced, the flexible inner layer 30 is separated from the rigid outer layer 32 and external air flows between the flexible inner layer 30 and the rigid outer layer 32 by way of the outer layer gap 110.

As illustrated in FIG. 1a, the cap 200 having a spout 300 is screwed onto the mouth section 12 of the molded double-layered container 10. The cap 200 has on the inner surface thereof a cap screw thread 96 that is to be engaged with the mouth section screw thread 94 formed on the mouth section 12.

As illustrated in FIG. 1a, the cap 200 has a one way valve 206 that allows air to get into the inside thereof only from the outside, a first packing 207 arranged at the remotest part of the inside (at the upper end) thereof and a second packing 208 arranged at the front end (at the lower end) thereof.

As illustrated in FIG. 1b, the one way valve 206 is fitted to the opening 210 formed at a lower part 202 of the cap 200 by means of a bolt 214 having a through hole 212 and a nut 216. A soft rubber-made one way valve member 220 of a known type is rigidly fitted to the through hole 212 by means of a screw member 222.

As the first screw fastening operation between the cap screw thread 96 and the mouth screw thread 94 is substantially completed, the top edge of the mouth section 12 comes into contact with the packing 207 and, at the same time, the second packing 208 at the lower end 202 of the cap 200 comes into contact with the sloped part 15, or the large diameter part, of the neck and shoulder section 14.

As the second screw fastening operation of driving the cap 200 further onto the mouth section 12 is conducted, both the first packing 207 and the second packing 208 are crushed further from the state illustrated in FIGS. 1a and 1b. As the second screw fastening operation is executed, force for pulling the mouth section 12 and the sloped part 15 of the neck and shoulder section 14 from each other and increasing the diameter of the small outer diameter part is applied to the part where the outer layer gap 110 is formed between the mouth section 12 and the sloped part 15 of the neck and shoulder section 14, or the small outer diameter part. Then, as a result, the outer layer gap 110 is completely opened or the area of the openings is increased to allow external air in the cap 200 to flow between the flexible inner layer 30 and the rigid outer layer 32 by way of the outer layer gap 110.

As illustrated in FIG. 6, the neck and shoulder section mold parts 112 for molding the neck and shoulder section 14 of the double-layered container 10 is integrally formed with the respective mouth mold parts 100 by means of steel NAK55 and embedded in the extended parts of the cylindrical lateral wall regions 70 that are made of aluminum 7075. With regard to the molding surfaces for the neck and shoulder section 14, if the parison P has an outer diameter of R, the innermost interval RS between the joining faces H of the neck and shoulder region 68 of the partial molds 60 for producing the outer layer gap 110 is typically 71.4% of the outer diameter R of the parison P.

More specifically, the innermost interval RS between the mating surfaces of the neck and shoulder region 68 of the partial molds 60 for producing the outer layer gap 110 is preferably between 99% and 50%, more preferably between 95% and 60%, most preferably between 95% and 70% of the outer diameter R of the parison P. This interval RS is determined so as to be able to produce an optimum outer layer gap 110 (see FIG. 5) and realize easiness of cutting out the gap burr, which will be described in greater detail hereinafter, in view of the environment temperature, the temperature of the parison P, the thickness and the diameter of the parison P and other factors.

With regard to the neck and shoulder region 68 of the partial molds 60 for molding the neck and shoulder section 14 of the double-layered container 10, FIG. 6 illustrates exemplar numerical values. Referring to FIG. 6, when the inner diameter of the parison P is 17.0 mm, the outer diameter R of the parison P is 21.0 mm, while the outer diameter PR of the mouth section 12 of the molded product is 21.5 mm and the inner diameter of the mouth section of the molded product is 17.3 mm, the smallest diameter parts of the joining faces H for the neck and shoulder section 14 of the molded product where the outer layer gap 110 is to be produced, namely the interval RS between the neck and shoulder parts 112 of the partial molds, is 15.0 mm (71.4% of the outer diameter of the parison P) as described above. The temperature of the parison P at the time of the molding operation is 190.0° C. and the mold temperature is 19.0° C.

Figure 7A:
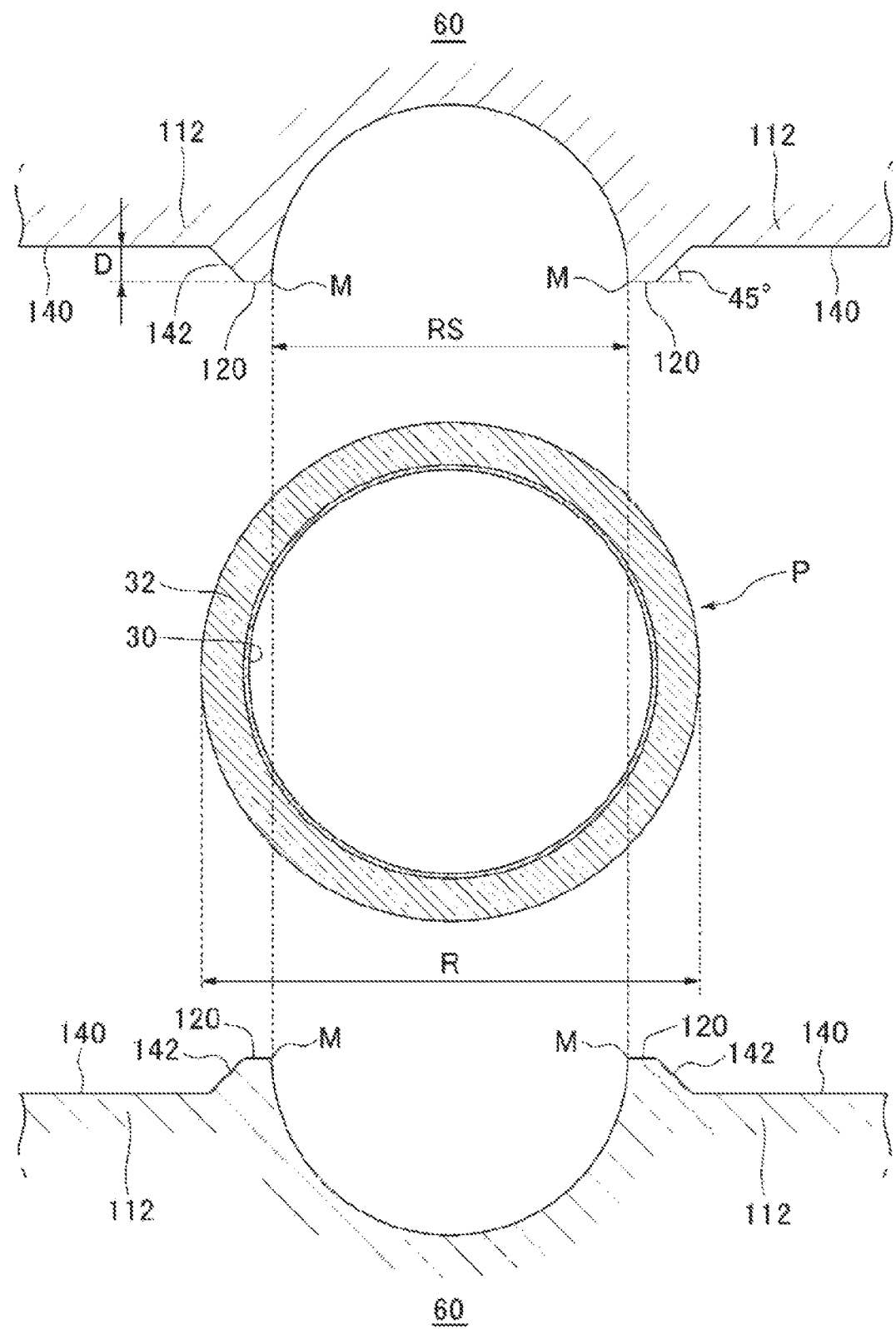
FIG. 7a is a schematic view taken along line VII-VII in FIG. 3a, illustrating the step of forming a gap burr of the first embodiment of method for producing a double-layered container, representing a parison P in a state before it is pinched between the partial molds of the split mold.

The pinch width as viewed in horizontal directions on the joining faces H (see FIG. 3a) at a pair of pinch parts 120 for producing the outer layer gap 110 is 0.2 mm. A gap burr receiving recess 140 for receiving a gap burr 130 is formed at the outside of the pair of pinch parts 120 on the joining faces H (see FIGS. 4 and 6). As illustrated in FIG. 7a, each of the gap burr receiving recesses 140 has a depth D of 1.5 mm and a slope 142 that is inclined by 45° relative to the mating faces H is formed around the entire periphery of each of the gap burr receiving recesses 140.

The step of forming the outer layer gap 110 of the double-layered container 10 to be produced by the first embodiment of production method according to the present invention proceeds in a manner as described below.

A parson P ready for the molding operation is arranged between the pair of partial molds 60 that are disposed vis-à-vis relative to each other and center-aligned as illustrated in FIGS. 3a, 6 and 7a.

Only a gap burr can be formed at a position by arranging a parison P ready for the molding operation eccentrically between the pair of partial molds 60 that are disposed vis-à-vis relative to each other.

Furthermore, a gap burr can be formed at a position other than the neck and shoulder section, for example at the mouth section or at the cylindrical body section.

Subsequently, as illustrated in FIG. 7a, the pair of partial molds 60 for forming a split mold are moved closer to each other toward the parison P. The innermost parts M of the joining faces H of the partial molds 60 contact the outer peripheral surface of the parison P both at the left side and at the right side in FIG. 7b when the interval separating the joining faces H of the pair of partial molds 60 comes to represent a predetermined value, which may, for example, be equal to 8.0 mm.

Figure 7C:
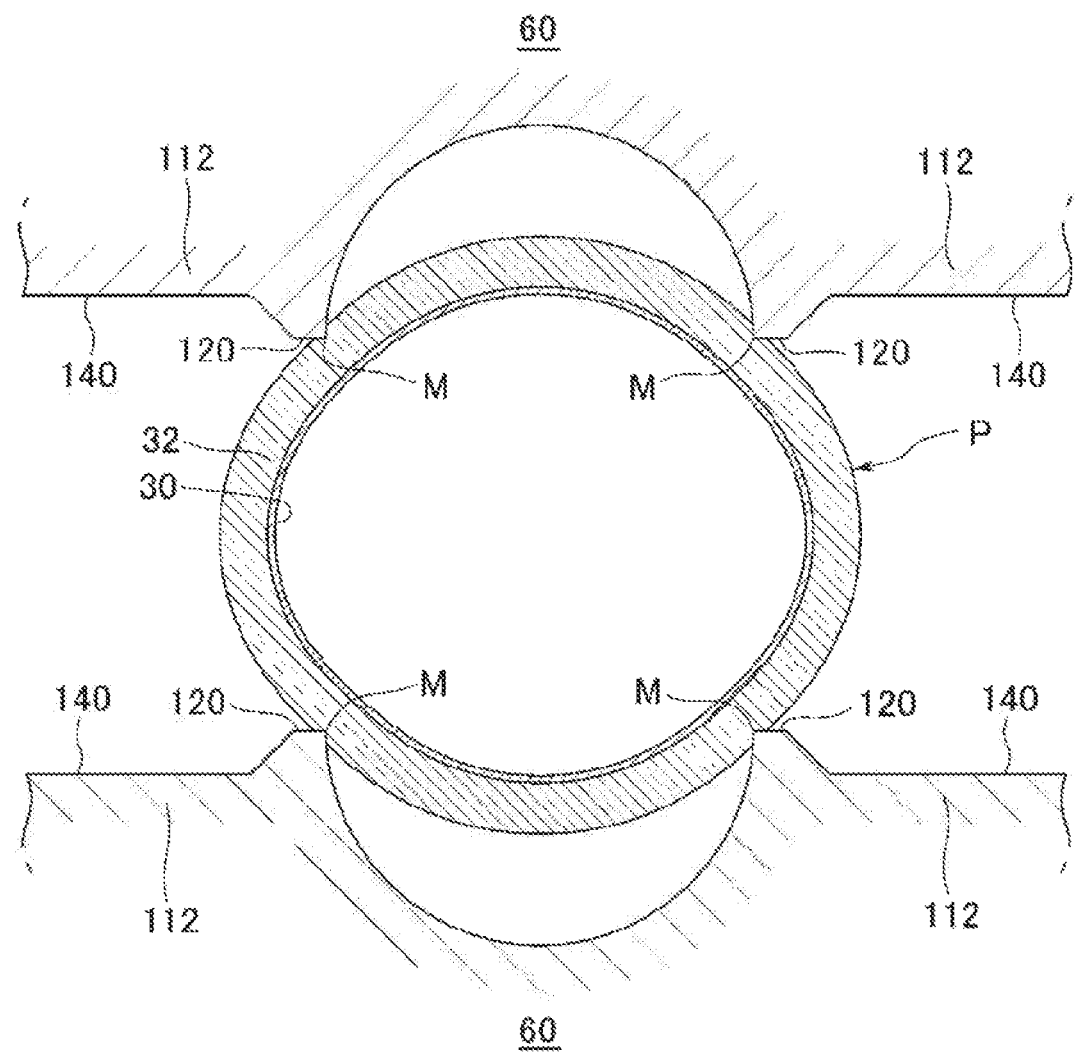
FIG. 7c is a schematic view taken along line VII-VII in FIG. 3a, illustrating the step of forming a gap burr of the first embodiment of method for producing a double-layered container, representing a state where the split mold has started to deform the parison P.

Thereafter, as the pair of partial molds 60 are brought closer relative to each other, the innermost parts M of the joining faces H and the parts located in the vicinity of the parts M of the joining faces H, which are referred to as a pair of pinch parts 120, come to pinch the parison P between the pair of pinch parts as illustrated in FIG. 7c. Both the flexible inner layer 30 and the rigid outer layer of the pinched parison P are then integrally and partly pushed further out of the pair of pinch parts 120 of the pair of joining faces H.

Then, as the pair of partial molds 60 are brought even closer relative to each other, the pair of pinch parts 120 of the joining faces H pinch tighter the flexible inner layer 30 and the rigid outer layer 32 between the pair to produce folded flexible inner layer 30 and also folded rigid outer layer 32 located outside the folded inner layer 30 at the outside of the oppositely disposed pair of pinch parts 120, the folded flexible inner layer 30 and the folded rigid outer layer 32 being also pinched by the pair of pinch parts 120 at the opposite sides, as illustrated in FIG. 7d. The folded parts of the rigid outer layer 32 are crushed and extend into the insides of the respective gap burr receiving recesses 140. As each of the folded parts of the flexible inner layer 30 comes to lie on itself so as to contact itself, it is bonded to itself due to its adhesiveness.

Figure 7E:
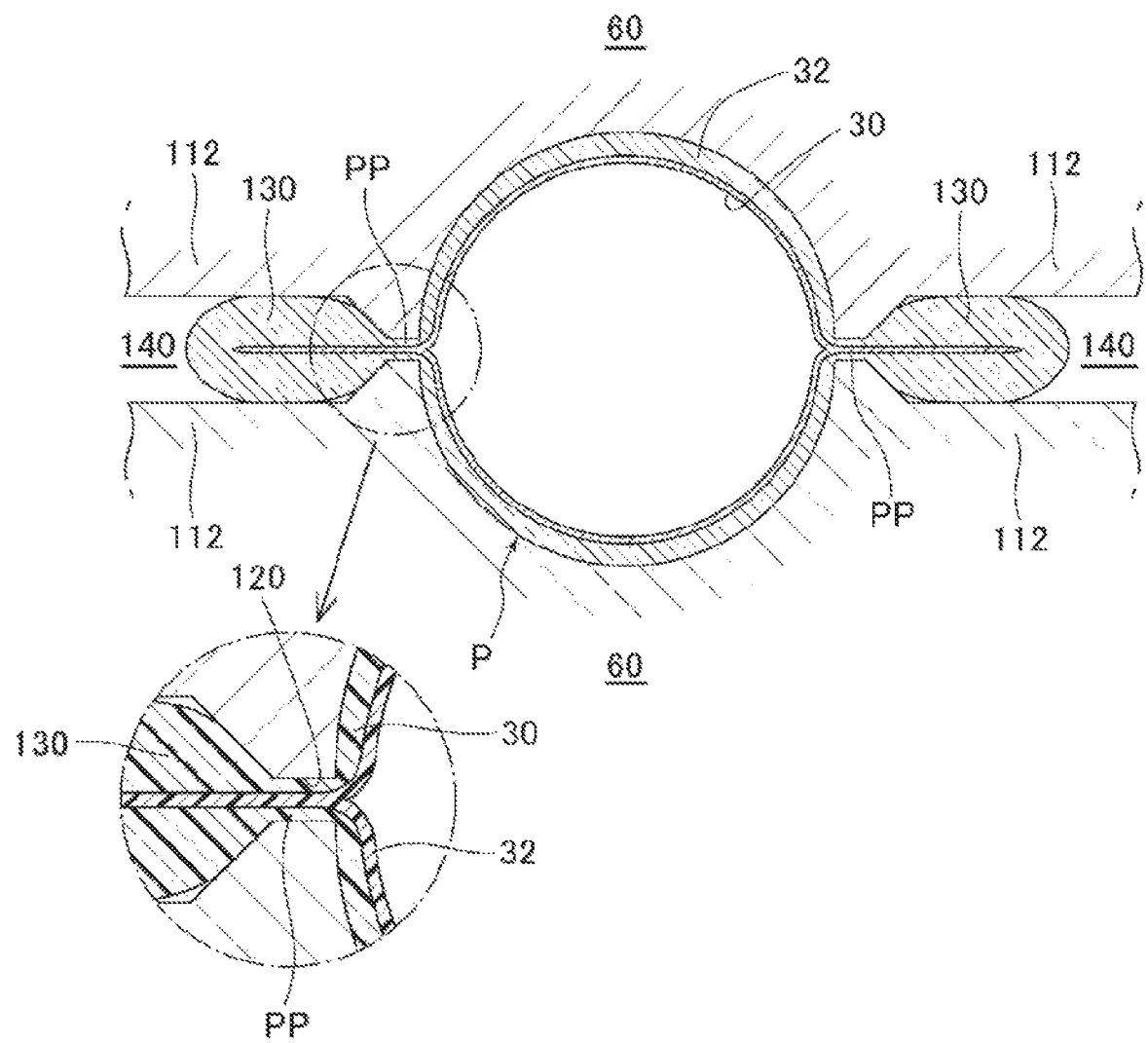
FIG. 7e is a schematic view taken along line VII-VII in FIG. 3a, illustrating the step of forming a gap burr of the first embodiment of method for producing a double-layered container, representing a state where a gap burr and a pinch section have already been formed by the split mold.
Figure 8:
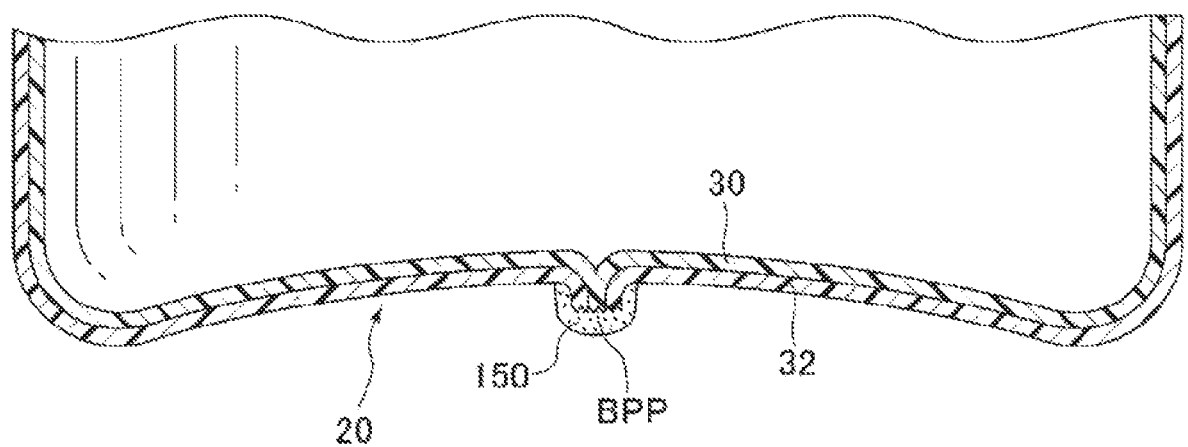
FIG. 8 is a schematic longitudinal cross-sectional view of the bottom section taken along line VIII-VIII in FIG. 1.

Subsequently, as the pair of partial molds 60 are brought closer to each other even further and pressed against to each other under force of 2 tons, for example, as illustrated in FIGS. 4 and 7e, the interval between the joining faces H of the pair of pinch parts 120, which is equal to the wall thickness of the parison P at the joining faces H, becomes to be between about 0.05 and 0.3 mm. The pushed out parts of the parison P produce a gap burr 130 by way of the pinched parts PP. Both of the joining faces of the partial molds of the split mold are flat and hence the pinched parts PP become flat plate-like parts when the partial molds are put together to produce a complete split mold. Note that the pinched parts PP are very thin parts of the parison P that are found between the joining faces when those parts of the parison P are pinched between the joining faces.

The bottom section 20 of the double-layered container 10 is produced as the parison P is pinched between the bottom regions 72 of the partial molds 60 at an intermediate position of the parison P in the operation where the partial molds 60 are put together to produce a complete split mold. The parts of the bottom regions 72 that operate as molds are made of steel NAK 55 same as the mouth section mold parts 100 and the neck and shoulder section mold parts 112 and embedded in the respective extended parts of the cylindrical body section lateral wall regions 70 that are made of aluminum 7075.

The part of the parison P located under the bottom section 20 produces a bottom pinched part BPP and a bottom burr 144 as illustrated in FIG. 4.

The gap burr 130 and the bottom burr 144 can be removed with ease to produce a double-layered container.

Note that, the regions of the flexible inner layer of the parison P located at the joining faces H of the partial molds of the split mold are pressed against each other to become an integrated part at the central transversal part of the bottom section 20 and the outer layer 32 is found at the opposite side of the integrated part. Then, since the flexible inner layer 30 and the rigid outer layer 32 do not represent any adhesiveness relative to each other at the part and can easily be separated from each other. In other words, a gap can highly possibly be produced between the flexible inner layer 30 and the rigid outer layer 32 at the part. Then, there can arise an undesired situation where water or some other liquid can be sucked into the container by way of the gap. In order to eliminate such an undesirable situation, the end part of the flexible inner layer 30 and the corresponding parts of the rigid outer layer 32 of the bottom section 20 are covered by a layer of an adhesive agent 150.

Second Embodiment

A double-layered container 10 that can be manufactured by the second embodiment of production method according to the present invention includes a flexible inner layer 30 that is made of polyamide (PA) and a rigid outer layer 32 that is made of polypropylene (PP). The flexible inner layer 30 and the rigid outer layer 32 do not represent any adhesiveness between them and hence can be separated from each other with ease.

With regard to the neck and shoulder regions 68 of the partial molds 60 for forming the neck and shoulder section 14 of the double-layered container 10, when the inner diameter of the parison P is 16.5 m and the outer diameter of the parison P is 20.5 m, while the outer diameter PR of the mouth section 12 of the molded product is 21.5 mm and the inner diameter of the mouth section 12 of the molded product is 17.3 mm, the smallest diameter parts of the joining faces H at the neck and shoulder section 14, where the outer layer gap 110 is to be produced, namely the interval RS between the neck and shoulder section mold parts 112 is 15.5 mm (72.1% of the outer diameter of the parison P). The temperature of the parison P at the time of the molding operation is 190.0° C. and the mold temperature at the time of the molding operation is 19.0° C.

The pinch width on the joining faces H of the pair of pinch parts 120 for producing the outer layer gap 110 at the joining faces H is 0.1 mm. A gap burr receiving recess 140 for producing a gap burr 130 (see FIG. 6) is formed at the outside of the pair of pinch parts 120 on the joining faces H. The gap burr receiving recesses 140 represent a depth D of 2.0 mm and a slope 142 that is inclined by 30° relative to the joining face H is formed around the entire periphery of each of the gap burr receiving recesses 140.

Third Embodiment

A double-layered container 10 that can be manufactured by the third embodiment of production method according to the present invention includes a three-layered flexible inner layer 30 that includes a low density polyethylene (LDPE) layer, an adhesive agent layer typically made of a polyolefin-based adhesive resin material and an ethylene-vinyl alcohol copolymer (EVOH) layer as viewed from the inside and a rigid outer layer 32 that is made of polycarbonate (PC). The flexible inner layer 30 and the rigid outer layer 32 do not represent any adhesiveness between them and hence can be separated from each other with ease.

The mouth section mold parts 100 and the neck and shoulder section mold parts 112 are integrally formed by using die steel SKD11.

With regard to the neck and shoulder regions 68 of the partial molds 60 for molding the neck and shoulder part 14 of the double-layered container 10, when the inner diameter of the parison P is 23.5 mm and the outer diameter R thereof is 28.5 mm, while the outer diameter PR of the mouth section 12 of the molded product is 29.0 mm and the inner diameter thereof is 23.5 mm, the smallest diameter parts of the joining faces H, namely the interval RS between the neck and shoulder section mold parts 112 for producing the outer layer gap 110 of the neck and shoulder part 14 is 20.0 mm (70.1% of the outer diameter of the parison P). The temperature of the parison P at the time of the molding operation is 210.0° C. and the mold temperature at the time of the molding operation is 19.0° C.

The pinch width at the pair of pinch parts 120 on the joining faces H for producing the outer layer gap 110 is 0.1 mm. A gap burr receiving recess 140 (see FIG. 6) for forming a gap burr 130 is formed at the outside of the pair of pinch parts 120 on the joining faces H of the mouth section mold parts 100. The depth D of the gap burr receiving recesses 140 is 2.0 mm and a slope 142 that is inclined by 45° relative to the mating faces H is formed around the entire periphery of the gap burr receiving recess 140.

Fourth Embodiment

A double-layered container that can be manufactured by the fourth embodiment of production method according to the present invention includes a four-layered flexible inner layer 30 that includes a blend layer of low density polyethylene (LDPE) and an adhesive resin material, an ethylene-vinyl alcohol copolymer (EVOH) layer, an adhesive agent layer typically made of a polyolefin-based adhesive resin material and an ethylene-vinyl alcohol copolymer (EVOH) layer as viewed from the inside and a rigid outer layer 32 that is made of polypropylene (PP). The flexible inner layer 30 and the rigid outer layer 32 do not represent any adhesiveness between them and hence can be separated from each other with ease.

The mouth section mold parts 100 and the neck and shoulder section mold parts 112 are integrally formed by using pre-hardened steel (NAK55).

With regard to the neck and shoulder region 68 of the partial mold 60 for forming the neck and shoulder section 14 of the double-layered container 10, the inner diameter of the parison P is 15.5 mm and the outer diameter R thereof is 20.0 mm, while the outer diameter PR of the mouth section 12 of the molded product is 20.5 mm and the inner diameter thereof is 17.3 mm, the smallest diameter parts of the joining faces H, namely the interval RS between the neck and shoulder section mold parts 112, of the neck and shoulder section 14 for producing the outer layer gap 110 is 13.0 mm (65.0% of the outer diameter of the parison P). The temperature of the parison P at the time of the molding operation is 190.0° C. The mold temperature at the time of the molding operation is 19.0° C.

The pinch width on the joining faces H of the pair of pinch parts 120 for producing the outer layer gap 110 at the joining faces H is 0.1 mm. A gap burr receiving recess 140 for producing a gap burr 130 (see FIG. 6) is formed at the outsides of the pair of pinch parts 120 on the joining faces H. The gap burr receiving recesses 140 represent a depth D of 1.5 mm and a slope 142 that is inclined by 60° relative to the joining face H is formed around the entire periphery of each of the gap burr receiving recesses 140.

With regard to each of the above-described embodiments, a gap burr receiving recess 140 is formed at each of the joining faces H of the mold parts. Additionally, excessive parison receiving recesses 500 may be formed for receiving the parison material that protrudes from the mold at the time of the blow molding operation, in the vicinity of the mouth burr region 64 and the mouth region 66 (see FIG. 3a).

Fifth Embodiment

A double-layered container 610 that can be manufactured by the fifth embodiment of production method according to the present invention differs from the double-layered container 10 manufactured by the first embodiment of production method according to the present invention in terms of the configuration of an upper part of the cylindrical body section 618 and that of the cap 620 as illustrated in FIG. 9a. The parts of the double-layered container 610 produced by the fifth embodiment that are the same as their counterparts of the double-layered container 10 produced by the first embodiment are indicated respectively by the same reference symbols and will not be described any further.

As illustrated in FIG. 9a, a cap 620 having a spout 300 is screwed onto the mouth section 612 of the double-layered container 610. The cap 620 has in the inside thereof a cap thread 694 that is to be engaged with the mouth section thread 696. The neck and shoulder section 615 of the double-layered container 610 has in the inside thereof an inside shoulder stepped part 616 and at the outside thereof an outside shoulder stepped part 617 that is located at a position lower than the inside shoulder stepped part 616 by a step.

Figure 9B:
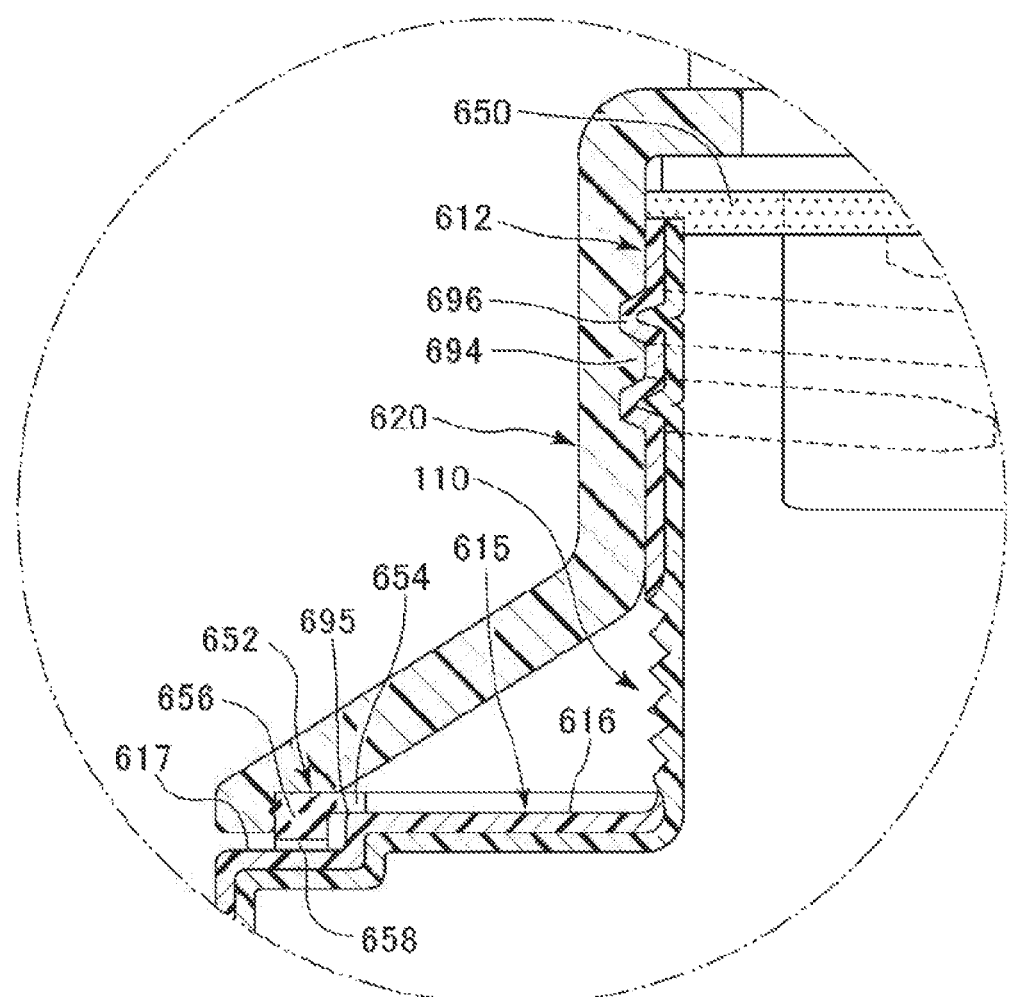

As illustrated in FIG. 9b, the cap 620 has a first packing 650 arranged at a remote position (upper end position) in the insider thereof and a second packing 652 arranged at the front end position (the lower end position) and having an one way valve so as to allow only external air to get into the inside from the outside.

As illustrated in FIG. 9b, the second packing is fitted and rigidly secured to the lower end part of the cap 620. The second packing 652 is ring-shaped and flexible. It includes a vertically thin inside valve part 654 and a vertically thick outside packing part 656. The packing part 656 has at the lower end surface thereof radially extending ventilation grooves 658.

As the cap thread 696 is screwed onto the mouth section thread 694 and the first step screwing/tightening operation is subsequently completed, the upper end edge of the mouth section 612 comes into contact with the first packing 650 and, at the same time, the packing part 656 of the second packing 652 comes into contact with the outside second shoulder stepped part 660 of the neck and shoulder section 615.

As the second step screwing/tightening operation of screwing the cap 620 further deep onto the mouth section 612 is carried on, the first packing 650 is crushed further than the extent of being crushed by the first step screwing/tightening operation. On the other hand, the packing part 656 of the second packing 652 pushes down the outside shoulder stepped part 617 of the neck and shoulder section 615. Then, as a result, the outer layer gap 110 is completely opened apart, or the opened apart area is increased so that the air in the cap 620 can flow between the flexible inner layer 30 and the rigid outer layer 32 through the outer layer gap 110. As the second step screwing/tightening operation is completed, the valve part 654 of the second packing 652 comes into contact with the outer peripheral edge 695 of the inside shoulder stepped part 616 in addition to the above-described effects so that a one way valve mechanism is produced there.

Sixth Embodiment

A double-layered container 710 that can be manufactured by the sixth embodiment of production method according to the present invention differs from the double-layered container 10 produced by the first embodiment of production method according to the present invention in terms of the configuration of an upper art of the cylindrical body section 718 and that of the cap 720. Therefore, the parts of the double-layered container 710 produced by the sixth embodiment that are the same as their counterparts of the double-layered container 10 produced by the first embodiment are indicated respectively by the same reference symbols and will not be described any further.

As illustrated in FIG. 10a, a cap 720 having a spout 300 is screwed onto the mouth section 712 of the double-layered container 710. The cap 720 has in the inside thereof a cap thread 794 that is to be engaged with the mouth section thread 796. The neck and shoulder section 724 of the double-layered container 710 has a horizontal shoulder stepped part 716.

As illustrated in FIGS. 10a and 10b, the cap 720 has a one way valve 706 that allows air to pass through it only from the outside into the inside thereof, a first packing 707 arranged at a remote position (upper end position) in the inside thereof and a second packing 708 arranged at the front end position (the lower end position). The one way valve 706 has a configuration substantially the same as the configuration of the one way valve 206 of the double-layered container produced by the first embodiment of production method according to the present invention.

As the first step screwing/tightening operation of screwing the cap 720 onto the mouth section of the double-layered container and making the cap thread 794 and the mouth section thread 796 to be engaged with each other is subsequently completed, the upper end edge of the mouth section 712 comes into contact with the first packing 707 and, at the same time, the second packing 708 at the lower end of the cap 720 comes into contact with the horizontal shoulder stepped part 716, namely the large diameter part, of the neck and shoulder section 724.

As the second step screwing/tightening operation of screwing the cap 720 further deep onto the mouth section 712 is carried on, both the first packing 707 and the second packing 708 are crushed to a large extent as illustrated in FIG. 10A. As a result of the second step screwing/tightening operation, the part of the double-layered container between the mouth section 712 and a horizontal shoulder stepped part 716 in the neck and shoulder section 724 where the outer layer gap 110 is produced, namely the small outer diameter part, is subjected to force that tends to separate the mouth section 712 and the horizontal shoulder stepped part 716 further and increase the diameter of the small outer diameter part. Then, as a result, the outer layer gap 110 is completely opened, or the opened area is raised, to allow air in the cap 720 to enter between the flexible inner layer 30 and the rigid outer layer 32 through the outer layer gap 110.

EXPLANATION OF REFERENCE SYMBOLS

P: parison
PP: pinched part
10: double-layered container
18: Cylindrical body section
22: cylindrical body section lateral surface
24: low density polyethylene (LDPE) layer
26: adhesive agent layer
28: ethylene vinyl alcohol copolymer (EVOH) layer
30: flexible inner layer
32: rigid outer layer
60: partial mold
64: mouth burr region
66: mouth region
68: neck and shoulder region
70: cylindrical body section lateral wall region
72: bottom region
80: mouth burr mold part
84: pin
86: vertical through hole
88: lower edge corner part
92: mouth burr
100: mouth section mold part
110: outer layer gap
112: neck and shoulder section mold part
120: pinch part
130: gap burr
140: gap burr receiving recess
142: slope
144: bottom burr
300: spout
500: excessive parison receiving recess

The invention claimed is:

1. A method for producing a double-layered container from a parison having at least two layers of an inner layer and an outer layer for respectively forming an outer layer container part and an inner layer container part that are separable from each other of the double-layered container by means of a molding process of molding the double-layered container by using a split mold formed by combining at least a pair of partial mold parts, the inner layer container part being capable of reducing capacity thereof while the outer layer container part maintains an original profile thereof as air is introduced between the outer layer container part and the inner layer container part, the method comprising:

forming a large diameter part having a predetermined diameter at a threaded part of a mouth section of the double-layered container to be engaged with the threaded cap, at a cylindrical body section, or between the mouth section and the cylindrical body section, forming a small diameter part having a diameter smaller than the predetermined diameter of the large diameter part between the large diameter part and the threaded part of the mouth section to be engaged with the threaded cap, forming a gap burr by pinching the parison corresponding to the small diameter part between at least innermost parts of joining faces of the pair of partial mold parts when the pair of partial mold parts are brought close to each other so as to be combined to form the split mold;

removing the gap burr;

screwing the threaded cap on and applying tension to the small diameter part cleared of the gap burr in a direction for separating the threaded part of the mouth section engaged with the threaded cap and the large diameter part to produce an outer layer gap at the small diameter part cleared of the gap burr; and forming a shield member for airtightly shielding the outer layer gap from the atmosphere on the double-layered container, the shield member having a one way valve for allowing external air to enter the outer layer gap.

2. The method according to claim 1, wherein the one way valve is fitted to the threaded cap.

3. The method according to claim 1, wherein the one way valve is formed by using the threaded cap, the cylindrical body section and a valve member arranged between the threaded cap and the cylindrical body section.

4. The method according to claim 1, wherein at least parts of the joining faces of at least the pair of partial mold parts are adapted to pinch the parison between lateral side parts thereof located at horizontally oppositely disposed positions of the double-layered container.

5. The method according to claim 1, wherein at least a part of the joining faces of at least the pair of partial mold parts is adapted to pinch the parison at a position thereof.

6. The method according to claim 1, wherein a knob projection is formed from the parison at an outside of the parts of the joining faces of at least the pair of partial mold parts that pinches the parison.

7. The method according to claim 1, wherein the parts of the joining faces of at least the pair of partial mold parts that pinch the parison correspond to a neck and shoulder section of the double-layered container.

8. The method according to claim 1, wherein the parts of the joining faces of at least the pair of partial mold parts that pinch the parison correspond to the mouth section of the double-layered container.

9. The method according to claim 1, wherein the parts of the joining faces of at least the pair of partial mold parts that pinch the parison correspond to the threaded part of the mouth section.

10. A double-layered container, comprising:

an inner layer container part and an outer layer container part, the double-layered container being produced from a parison having at least two layers of an inner layer and an outer layer for respectively forming the outer layer container part and the inner layer container part that are separable from each other of the double-layered container by means of a molding process of molding the double-layered container by using a split mold formed by combining at least a pair of partial mold parts, the inner layer container part being configured to reduce a capacity thereof while the outer layer container part maintains an original profile thereof as air is introduced between the outer layer container part and the inner layer container part, the double-layered container being configured to be provided with a threaded cap, a large diameter part having a predetermined diameter and a small diameter part having a diameter smaller than the predetermined diameter of the large diameter part, the large diameter part being formed at a threaded part of a mouth section of the double-layered container to be engaged with the threaded cap, at a cylindrical main body, or between the mouth section and the cylindrical main body;

wherein a gap burr, which was formed by pinching the parison corresponding to the small diameter part between at least innermost parts of joining faces of the pair of partial mold parts when the pair of partial mold parts were brought close to each other so as to be combined to form the split mold, has been removed;

wherein the double-layered container comprises an outer layer gap at areas of the small diameter part from which the gap burr was removed, the outer layer gap having been formed by, as the threaded cap is screwed on, applying tension to the small diameter part, from which the gap burr was removed, in a direction for separating the threaded part of the mouth section engaged with the threaded cap and the large diameter part, to produce; and wherein the double-layered container has shield members for airtightly shielding the outer layer gap from the atmosphere on the double-layered container, the shield members having a one way valve for allowing external air to enter the outer layer gap.

11. The container according to claim 10, wherein the one way valve is fitted to the threaded cap.

12. The container according to claim 10, wherein the one way valve is formed by using the threaded cap, the cylindrical body section and a valve member arranged between the threaded cap and the cylindrical body section.

13. The container according to claim 10, wherein a position where the gap burr is removed is the threaded part for screwing the threaded cap on, the cylindrical body section or lateral side parts thereof located between the threaded part and the cylindrical body section, at horizontally oppositely disposed positions of the double-layered container.

14. The container according to claim 10, wherein a position where the gap burr is removed is the threaded part for screwing the threaded cap on, the cylindrical body section or a position located between the threaded part and the cylindrical body section them.

15. The container according to claim 10, wherein a position where the gap burr is removed is the neck and shoulder section of the double-layered container.

16. The container according to claim 10, wherein a position where the gap burr is removed is the mouth section of the double-layered container.

17. The container according to claim 10, wherein a position where the gap burr is removed is the threaded part for screwing the threaded cap on of the double-layered container.

* * * * *